United States Patent
Takechi

(10) Patent No.: US 11,604,369 B2
(45) Date of Patent: Mar. 14, 2023

(54) BIAS CONTROL METHOD OF OPTICAL MODULATOR AND OPTICAL TRANSMISSION MODULE

(71) Applicant: SUMITOMO ELECTRIC INDUSTRIES, LTD., Osaka (JP)

(72) Inventor: Masaru Takechi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/654,867

(22) Filed: Mar. 15, 2022

(65) Prior Publication Data
US 2022/0299800 A1    Sep. 22, 2022

(30) Foreign Application Priority Data

Mar. 19, 2021 (JP) .............................. JP2021-046245
Jan. 25, 2022 (JP) .............................. JP2022-009239

(51) Int. Cl.
*G02F 1/01*    (2006.01)
*G02F 1/21*    (2006.01)
*H04B 10/50*   (2013.01)

(52) U.S. Cl.
CPC ............ *G02F 1/0123* (2013.01); *G02F 1/212* (2021.01); *H04B 10/50575* (2013.01)

(58) Field of Classification Search
CPC .. H04B 10/50575; G02F 1/0123; G02F 1/212
USPC .......................................................... 398/198
See application file for complete search history.

(56) References Cited

U.S. PATENT DOCUMENTS

| | | | | |
|---|---|---|---|---|
| 8,761,548 | B2* | 6/2014 | Kuwahara | G02F 1/0123 385/2 |
| 9,641,257 | B2* | 5/2017 | Sugihara | G02F 1/0123 |
| 10,243,662 | B2* | 3/2019 | Li | G02F 1/225 |
| 2012/0033964 | A1* | 2/2012 | Mamyshev | G02F 1/2255 398/25 |
| 2012/0288284 | A1* | 11/2012 | Yoshida | H04B 10/50595 398/186 |
| 2020/0133035 | A1 | 4/2020 | Kawakami et al. | |

* cited by examiner

FOREIGN PATENT DOCUMENTS

WO    2019/013278    1/2019

OTHER PUBLICATIONS

Cho et al; Closed-Loop Bias Control of Optical Quadrature Modulator; Nov. 2006; IEEE Photonics Technology Letters vol. 18, No. 21; pp. 1-3. (Year: 2006).*

*Primary Examiner* — Amritbir K Sandhu
(74) *Attorney, Agent, or Firm* — IPUSA, PLLC

(57) ABSTRACT

A bias control method of a nested optical modulator includes detecting a frequency component that has a frequency equal to a frequency of a dither signal and that is included in an output of the optical modulator, with changing a voltage value of a first bias, to measure a first error-detection value, obtaining a first error-detection curve representing a relationship between the first error-detection value and the voltage of the first bias, obtaining a first correction value based on the first error-detection curve, and obtaining the first error-detection value obtained when the first bias voltage value is equal to a voltage value obtained by adding the first correction value to the first bias voltage value at a zero-crossing point of the first error-detection curve, as a first error control value. The first bias is controlled so that the first error-detection value is the first error control value.

6 Claims, 24 Drawing Sheets

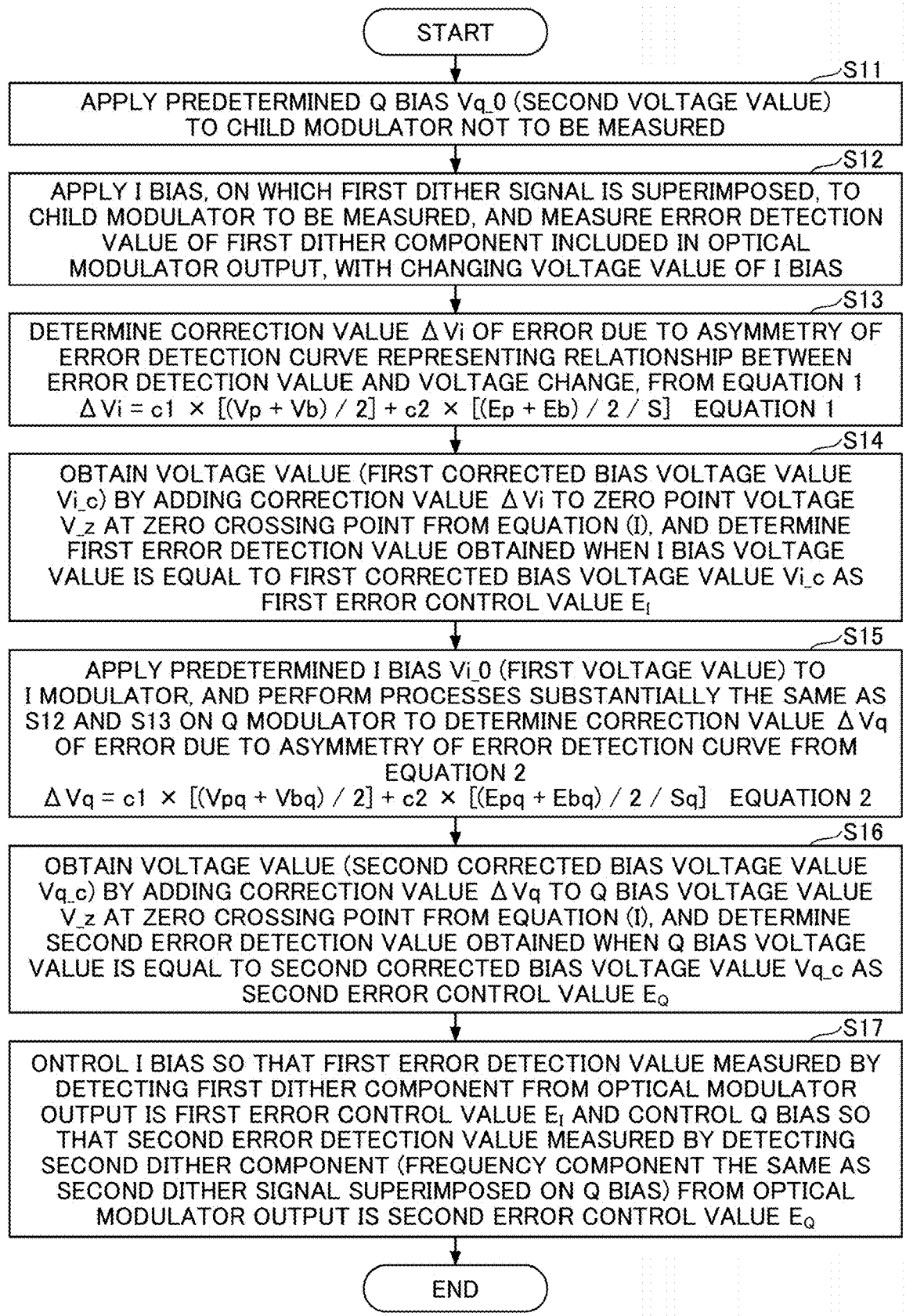

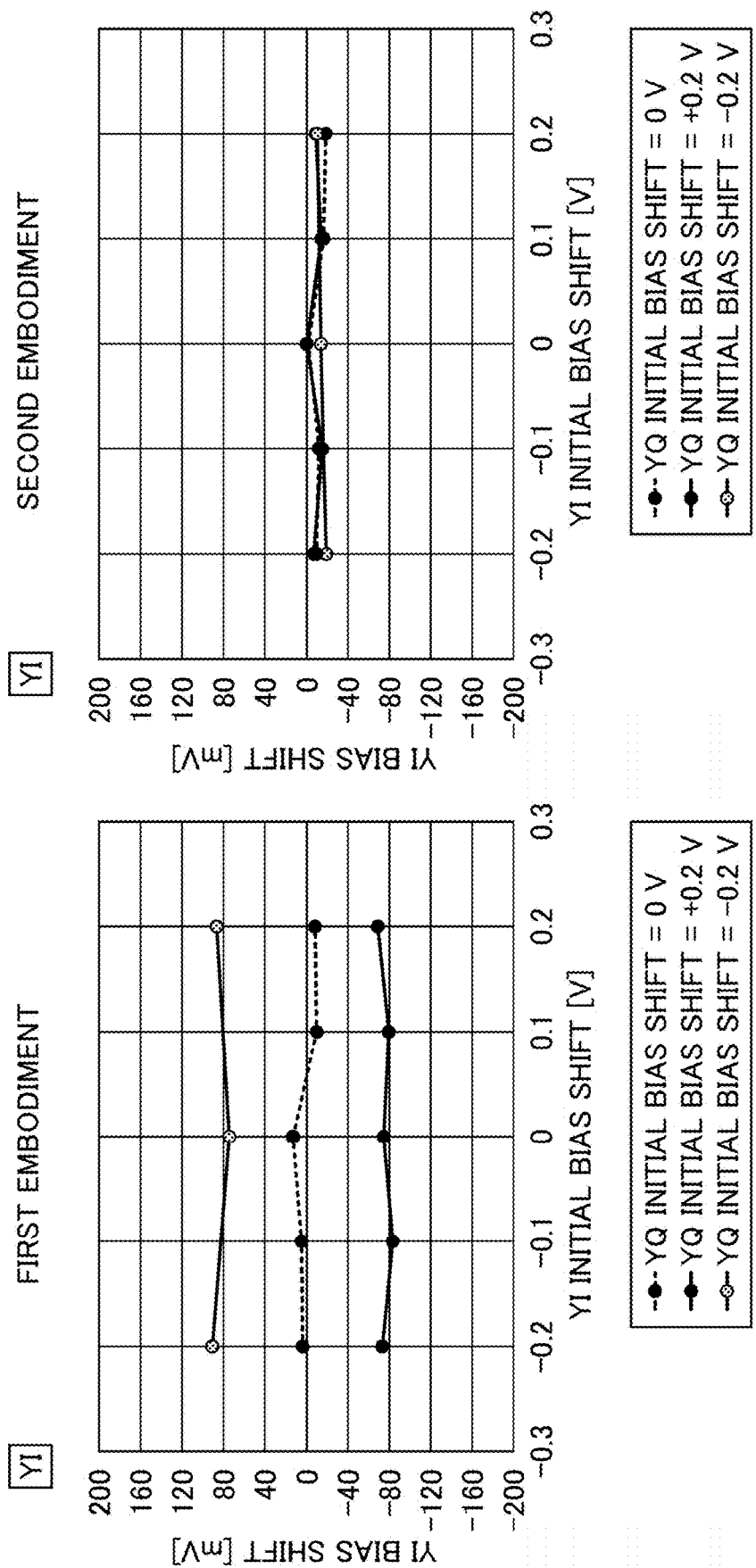

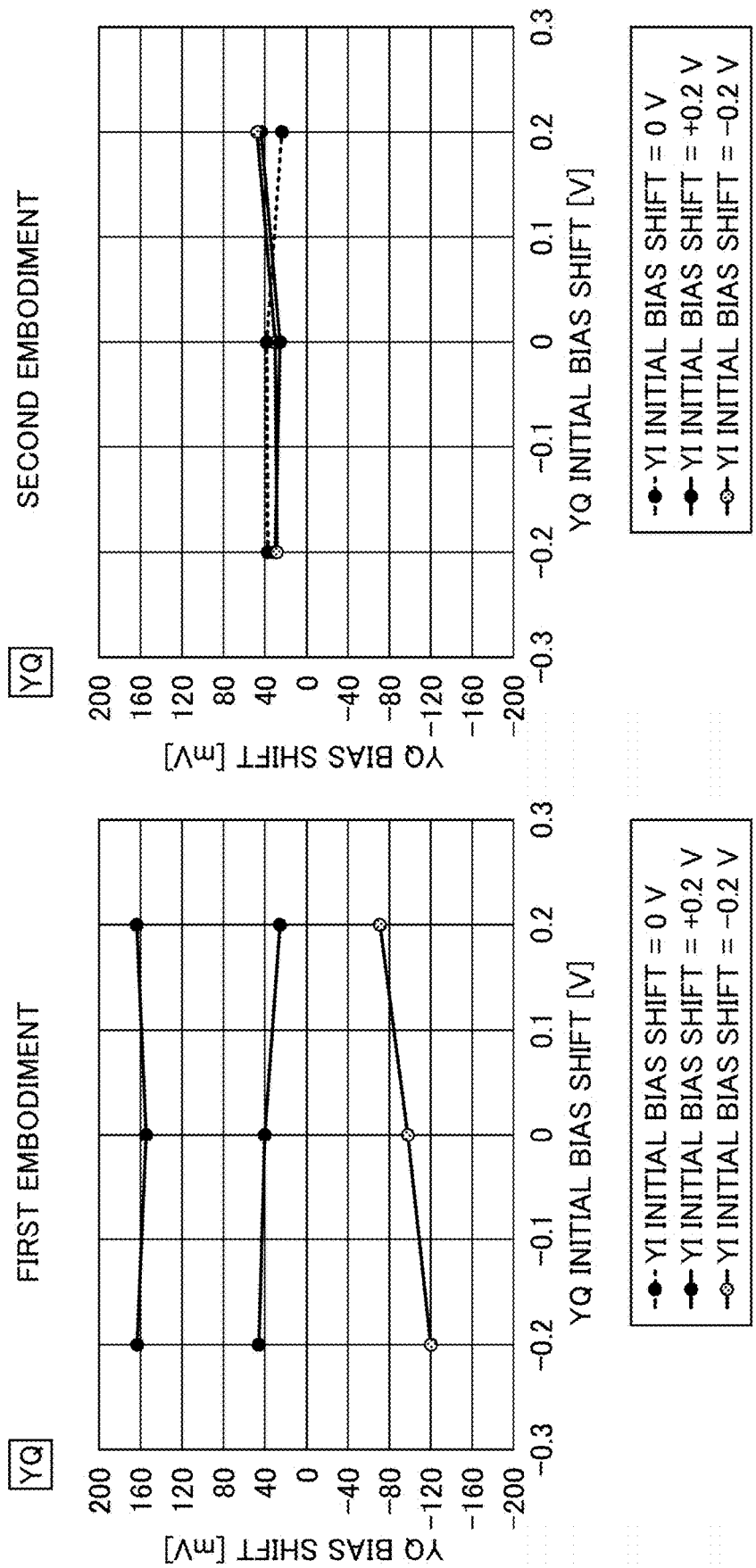

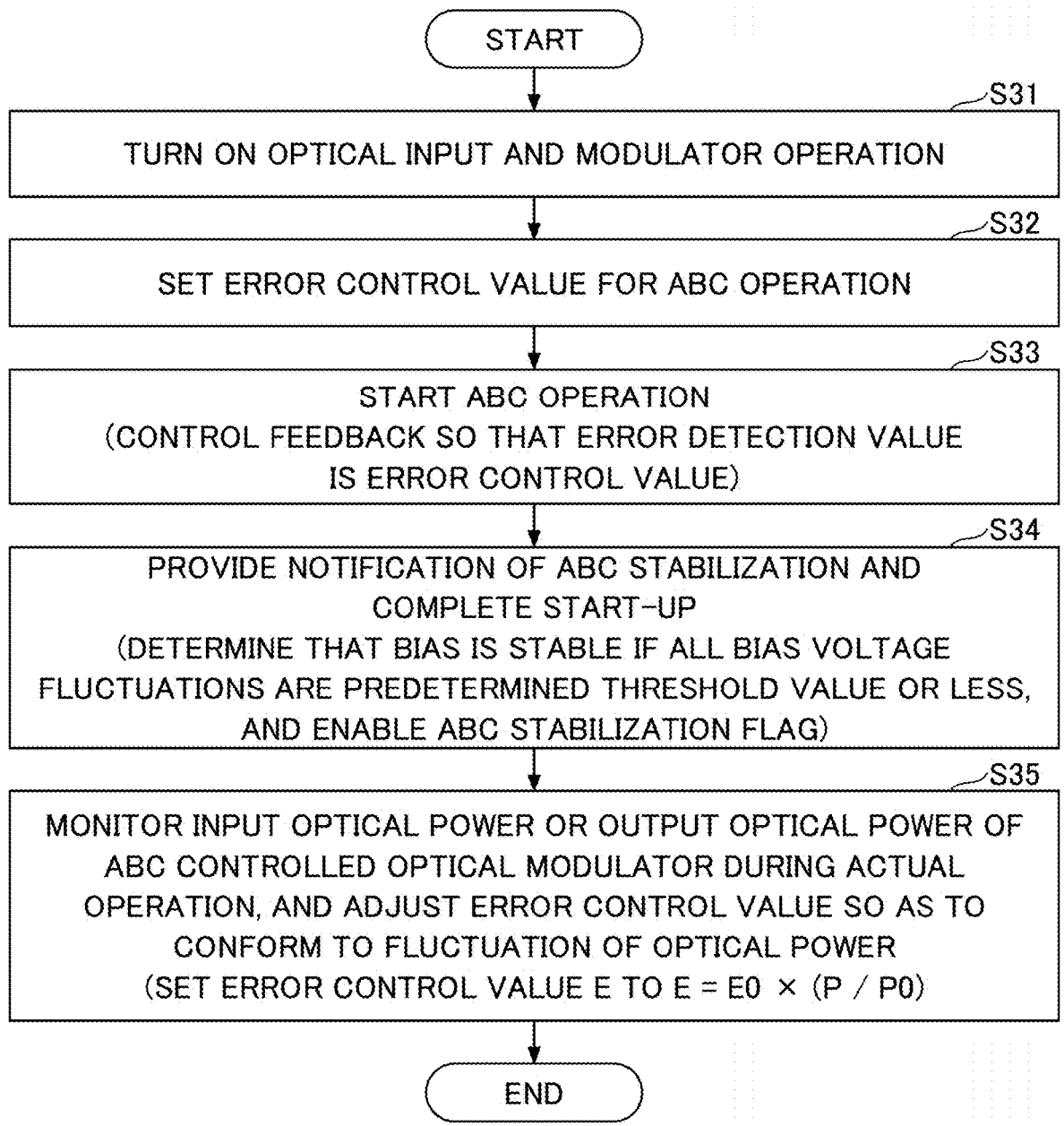

BIAS CONTROL METHOD OF OPTICAL MODULATOR AND OPTICAL TRANSMISSION MODULE

CROSS-REFERENCE TO RELATED APPLICATIONS

This application claims priority to Japanese Patent Application No. 2021-046245 filed on Mar. 19, 2021, and Japanese Patent Application No. 2022-009239 filed on Jan. 25, 2022, the entire contents of which are incorporated herein by reference.

BACKGROUND

1. Field of the Invention

The present disclosure relates to a bias control method of an optical modulator and relates to an optical transmission module.

2. Description of the Related Art

As demand for communications increases, a digital coherent optical method, by which high-speed and high-capacity communication is achieved, is widely used. In the digital coherent method, optical signals of a phase I (an in-phase) and a phase Q (a quadrature phase) having a phase difference of π/2 radians (90°) are used, so that the amount of information is doubled relative to the intensity modulation and the direct detection method.

To generate a phase I optical signal and a phase Q optical signal, an IQ modulator, in which two Mach-Zehnder modulators (MZM) are connected in parallel and a phase difference of π/2 (hereafter, the angle unit "radians" is omitted) is provided between two channels, is used. The two channels connected in parallel are also referred to as an I-arm and a Q-arm. The modulators forming the I-arm and the Q-arm are referred to as child modulators, and the entire MZ interferometer is referred to as a parent modulator. Bias control is performed so that each child modulator and the parent modulator operate mainly at an optimum bias point.

In a typical bias control, a small amplitude dither signal is superimposed on a bias voltage, and the bias voltage of the child modulator is controlled so as to minimize a dither frequency component included in a light output from an optical modulator. A control method, in which, while a bias voltage (a second bias voltage) of one child modulator is changed within a predetermined range, a candidate value of a bias voltage (a first bias voltage) of the other child modulator that is observed when the output power of the optical modulator converges to near the maximum or the minimum is recorded, is proposed (see, for example, Patent Document 1). In this method, at each point of the second bias voltage, a first candidate voltage and a second candidate voltage of the first bias voltage are recorded, and the first bias voltage is determined based on a difference between the first candidate voltage and the second candidate voltage.

When the bias voltage is controlled to minimize the dither frequency component included in the output light of the optical modulator in automatic bias control (ABC) of the MZM, the controlled bias voltage does not necessarily converge to an optimum bias point. Despite that the bias control is performed, a shift may occur from the optimal bias point. It is conceivable that this is due to the asymmetry of the modulation characteristic that is caused by differences in the extinction ratio and the light loss between the I-arm and the Q-arm, the manufacturing error, the wavelength change, and the like.

It is desired to provide an automated bias control technique for a Mach-Zehnder optical modulator that reduces a shift from the optimum bias point.

Related Art Documents

Patent Document

[Patent Document 1] WO 2019/013278

SUMMARY

According to one aspect of the disclosure, a bias control method of a nested optical modulator, in which a first child modulator and a second child modulator form two arms of a parent modulator, includes:

a) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;

b) obtaining a first error detection curve representing a relationship between the first error detection value and the voltage value of the first bias;

c) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;

d) obtaining a first correction value $\Delta Vi$ based on Equation 1, where $Vp$ is the first peak error voltage value, $Vb$ is the first bottom error voltage value, $Ep$ is the first peak error detection value, $Eb$ is the first bottom error detection value, $c1$ is a first weight value, $c2$ is a second weight value, and $S$ is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1); and}$$

e) obtaining the first error detection value that is obtained when the voltage value of the first bias is equal to a voltage value obtained by adding the first correction value $\Delta Vi$ to the voltage value the first bias at the first zero crossing point, as a first error control value. The first bias is controlled so that the first error detection value is the first error control value. The first error detection value is measured by detecting the first frequency component included in the output of the optical modulator. The frequency of the first frequency component is equal to the frequency of the first dither.

According to at least one embodiment of the present disclosure, an automatic bias control technique for a Mach- Zehnder optical modulator that reduces a shift from the optimal bias point is provided.

BRIEF DESCRIPTION OF THE DIAGRAMS

FIG. 11 is a flowchart of a bias control method according to the first embodiment;

FIG. 16A is a graph indicating an improvement effect of the bias control method according to the second embodiment;

FIG. 16B is a graph indicating an improvement effect of the bias control method according to the second embodiment;

Figure 18A:
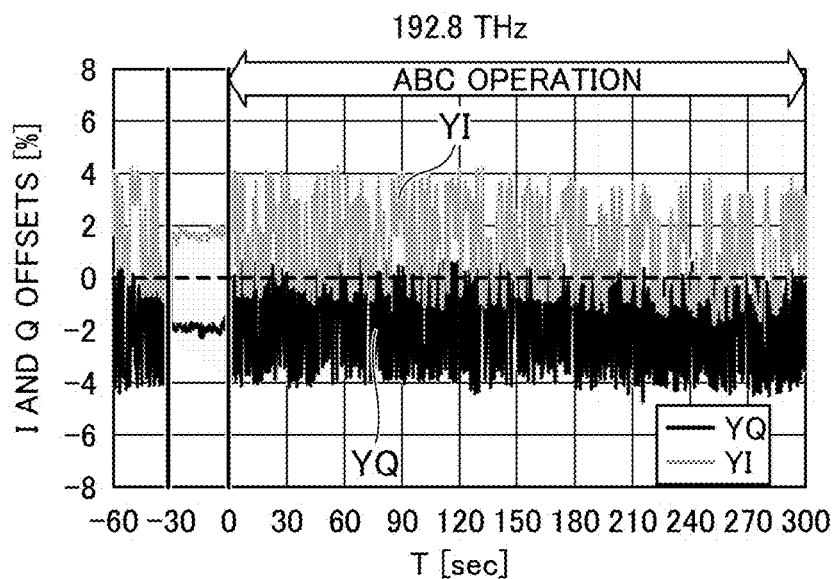
Figure 18B:
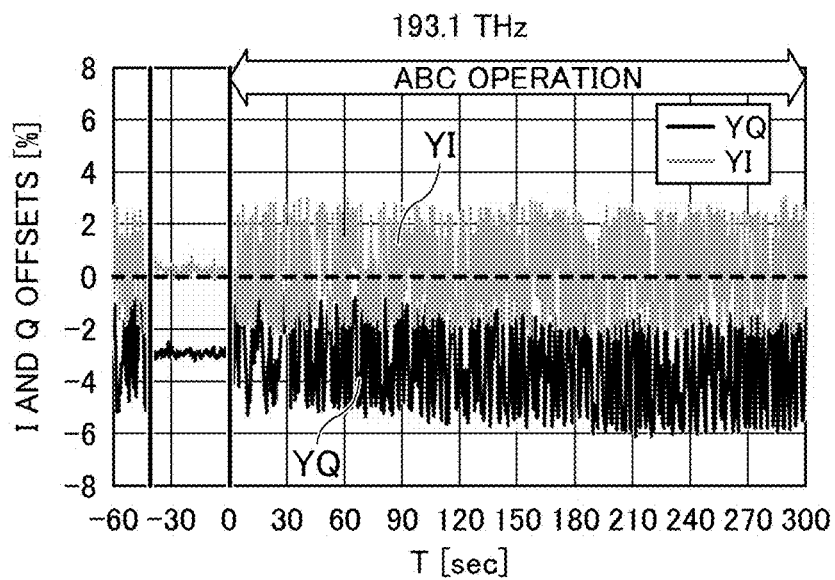
Figure 18C:
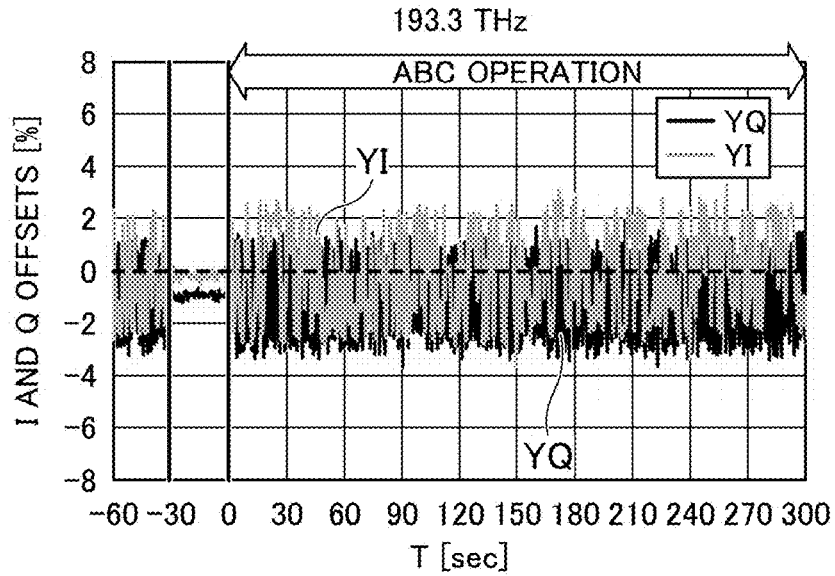
Figure 20:
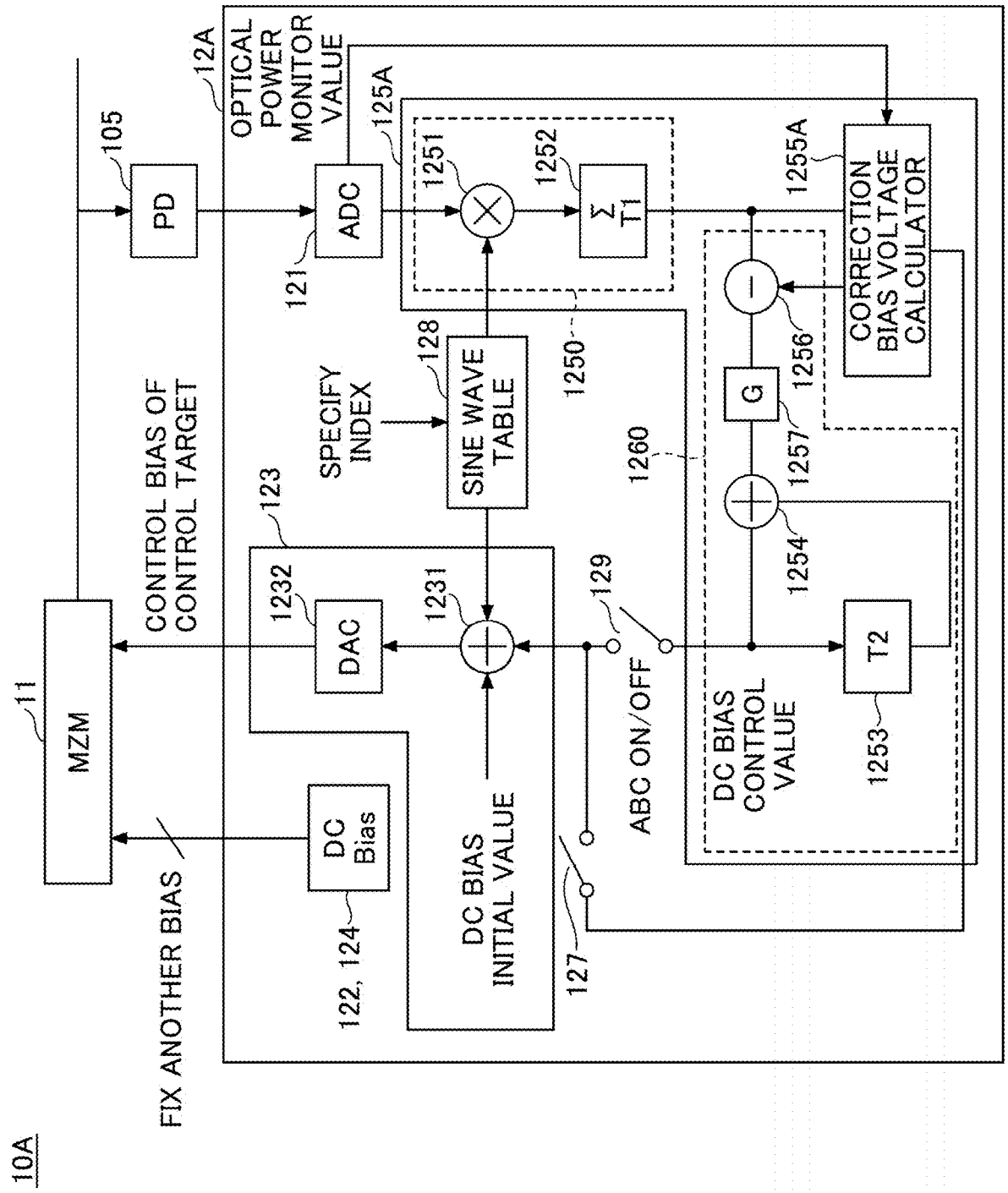
Figure 21:
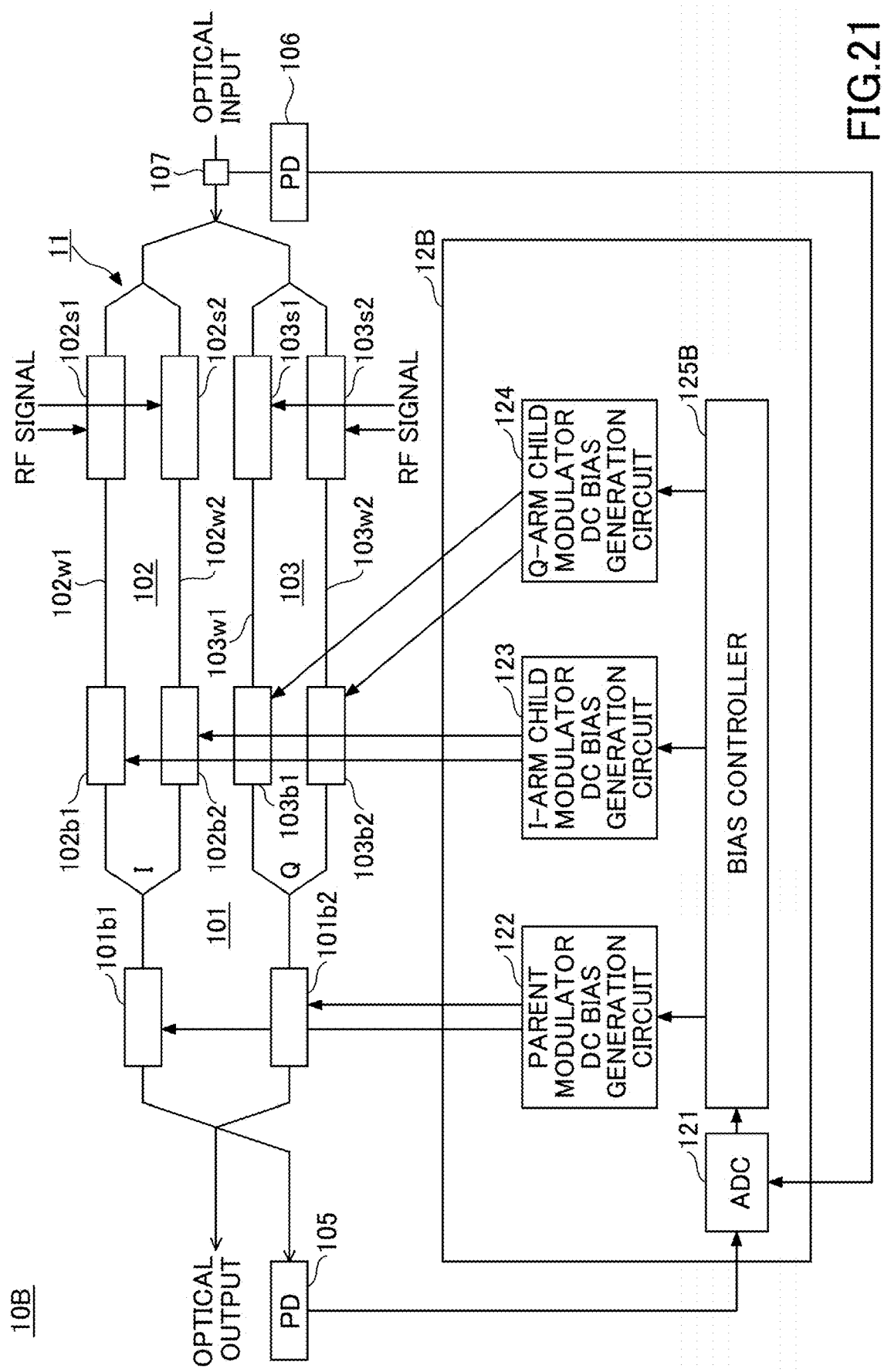
Figure 22:
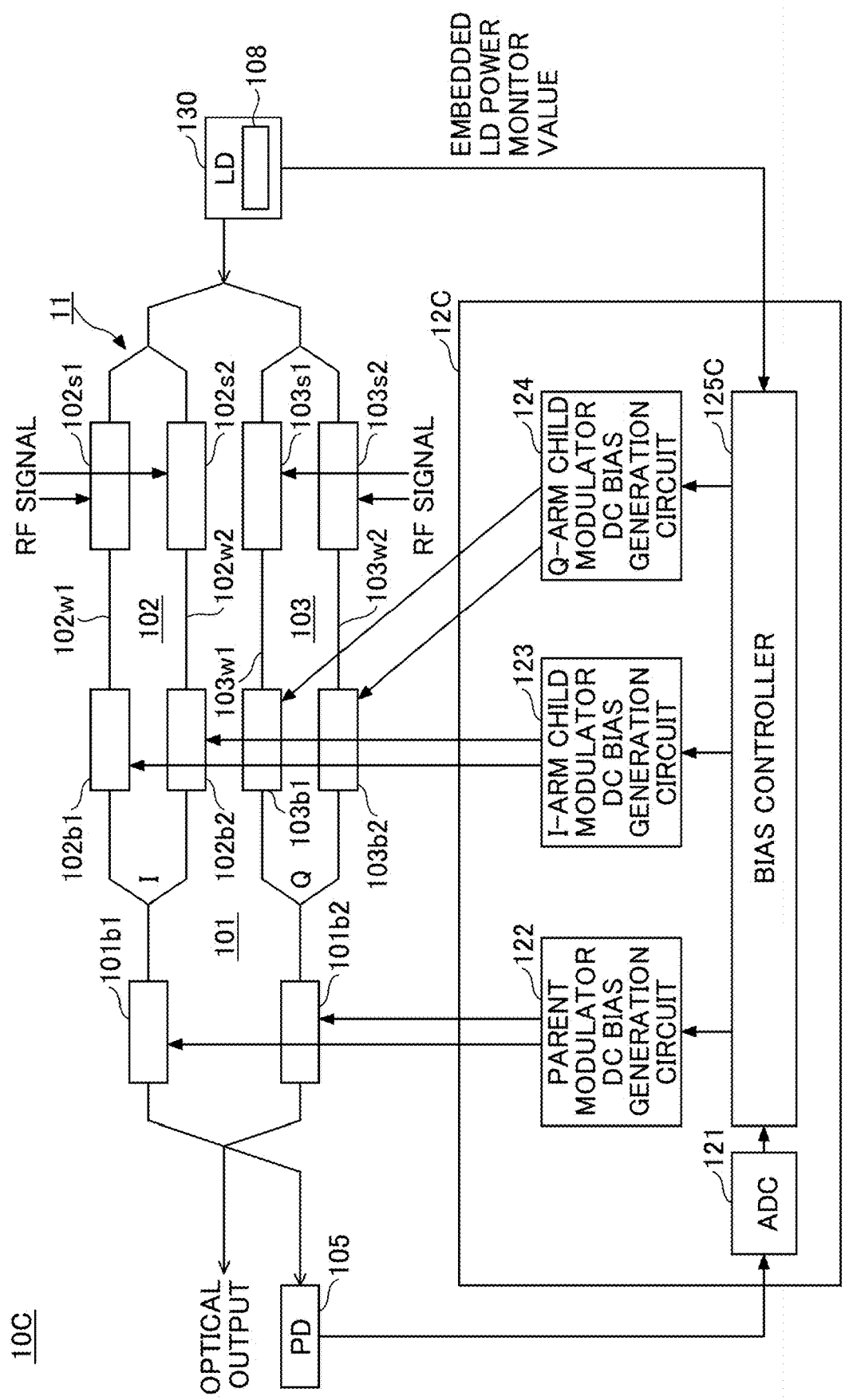

FIG. 18A, FIG. 18B, and FIG. 18C are graphs indicating the effect of the bias control according to the second embodiment;

FIG. 19 is a flowchart of a bias control method according to a third embodiment;

FIG. 20 is a schematic view illustrating a bias control circuit of an optical transmission module according to the third embodiment, and illustrating a monitor of the optical power fluctuation using the output light of the optical modulator;

FIG. 21 is a diagram illustrating another configuration example of a monitor of an optical power fluctuation; and FIG. 22 is a diagram illustrating yet another configuration example of a monitor of an optical power fluctuation.

DETAILED DESCRIPTION

Embodiments will be described below.

Description of Embodiments of the Present Disclosure

Embodiments of the present disclosure will first be listed. In the following description, the same or corresponding elements are referenced by the same references and the description thereof is not repeated.

[1] A bias control method according to one aspect of the present disclosure is a bias control method of a nested optical modulator, in which a first child modulator and a second child modulator form two arms of a parent modulator, and the bias control method includes:

a) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;

b) obtaining a first error detection curve representing a relationship between the first error detection value and the voltage value of the first bias;

c) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;

d) obtaining a first correction value $\Delta Vi$ based on Equation 1, where $Vp$ is the first peak error voltage value, $Vb$ is the first bottom error voltage value, $Ep$ is the first peak error detection value, $Eb$ is the first bottom error detection value, $c1$ is a first weight value, $c2$ is a second weight value, and $S$ is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1); and}$$

e) obtaining the first error detection value that is obtained when the voltage value of the first bias is equal to a voltage value obtained by adding the first correction value $\Delta Vi$ to the voltage value the first bias at the first zero crossing point, as a first error control value. The first bias is controlled so that the first error detection value is the first error control value. The first error detection value is measured by detecting the first frequency component included in the output of the optical modulator. The frequency of the first frequency component is equal to the frequency of the first dither.

By using the first error detection value obtained when the voltage value of the first bias is equal to a voltage value obtained by adding the first correction value obtained based on the first error detection curve to the voltage value of the first bias at the zero crossing point, as a first error control value, to control the first bias so that the first error detection value measured by detecting the component that is included in the output of the optical modulator and that has the same frequency as the first dither signal is the first error control value, the shift of the bias voltage from the optimum bias point due to the asymmetry of the modulator characteristic can be suppressed.

[2] In [1], the bias control method further includes:

applying a second bias having a second voltage value to the second child modulator before a);

performing, after e), steps including:
- f) applying the first bias having a first voltage value to the first child modulator;
- g) detecting a second frequency component included in the output of the optical modulator, in a state in which the local light is input to the optical modulator and a modulation signal is applied to the second child modulator together with the second bias on which a second dither signal is superimposed, with changing a voltage value of the second bias, to measure a second error detection value; the second frequency component having a frequency equal to a frequency of the second dither signal,
- h) obtaining a second error detection curve representing a relationship between the second error detection value and the voltage value of the second bias;
- i) obtaining a second peak error detection value, a second bottom error detection value, a second peak error voltage value, and a second bottom error voltage value, from the second error detection curve, the second peak error detection value being a peak value of the second error detection value, the second bottom error detection value being a bottom value of the second error detection value, the second peak error voltage value being the voltage value of the second bias that is observed when the second error detection value is the second peak error detection value, and the second bottom error voltage value being the voltage value of the second bias that is observed when the second error detection value is the second bottom error detection value;
- j) obtaining a second correction value $\Delta Vq$ based on Equation 2, where $Vpq$ is the second peak error voltage value, $Vbq$ is the second bottom error voltage value, $Epq$ is the second peak error detection value, $Ebq$ is the second bottom error detection value, and $Sq$ is a slope of the second error detection curve at a second zero crossing point between the second peak error voltage value and the second bottom error voltage value, $$\Delta Vq = c1 \times [(Vpq+Vbq)/2] + c2 \times [(Epq+Ebq)/2/Sq] \quad \text{(Equation 2)};$$

and
- k) obtaining the second error detection value that is obtained when the voltage value of the second bias is equal to a voltage value obtained by adding the second correction value $\Delta Vq$ to the voltage value the second bias at the second zero crossing point, as a second error control value. The second bias is controlled so that the second error detection value is the second error control value. The second error detection value is obtained by detecting the second frequency component included in the output of the optical modulator. The frequency of the second frequency component is equal to the frequency of the second dither.

The above-described method can suppress the shift from the optimum bias point due to the asymmetry of the modulator characteristic, even when the modulator characteristic is asymmetric due to differences in the extinction ratio and the optical loss between the I-arm and the Q-arm, the manufacturing error, the wavelength change, the driving amplitude change, and the like.

[3] In [1], the bias control method further includes performing, after or in parallel to the control of the first bias, a step of:
- l) monitoring optical power input to the optical modulator or output from the optical modulator to correct the first error control value based on $E=E0\times(P/P0)$, where $P$ is a value of the optical power based on a result of the monitoring, $E$ is the first error control value, $P0$ is a reference value of the optical power, and $E0$ is the first error control value obtained when a value of the optical power is the reference value.

Even when the power of the light input to the optical modulator fluctuates, the bias voltage of the child modulator can be appropriately controlled during the bias control operation so as to conform to the fluctuation of the optical power to correct the first error control value.

[4] A bias control method according to another aspect of the present disclosure is a bias control method of a nested optical modulator in which a first child modulator and a second child modulator form two arms of a parent modulator, and the bias control method includes:
- A) applying a second bias having a second voltage value to the second child modulator;
- B) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;
- C) obtaining a first error detection curve representing a relationship between the first error detection value and the voltage value of the first bias;
- D) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;
- E) obtaining a first correction value $\Delta Vi$ based on Equation 1, where $Vp$ is the first peak error voltage value, $Vb$ is the first bottom error voltage value, $Ep$ is the first peak error detection value, Eb is the first bottom error detection value, c1 is a first weight value, c2 is a second weight value, and S is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1)};$$

F) applying the first bias having the first voltage value to the first child modulator;
G) detecting a second frequency component included in the output of the optical modulator, in a state in which the local light is input to the optical modulator and a modulation signal is applied to the second child modulator together with the second bias on which a second dither signal is superimposed, with changing a voltage value of the second bias, to measure a second error detection value; the second frequency component having a frequency equal to a frequency of the second dither signal,
H) obtaining a second error detection curve representing a relationship between the second error detection value and the voltage value of the second bias;
I) obtaining a second peak error detection value, a second bottom error detection value, a second peak error voltage value, and a second bottom error voltage value, from the second error detection curve, the second peak error detection value being a peak value of the second error detection value, the second bottom error detection value being a bottom value of the second error detection value, the second peak error voltage value being the voltage value of the second bias that is observed when the second error detection value is the second peak error detection value, and the second bottom error voltage value being the voltage value of the second bias that is observed when the second error detection value is the second bottom error detection value;
J) obtaining a second correction value $\Delta Vq$ based on Equation 2, where Vpq is the second peak error voltage value, Vbq is the second bottom error voltage value, Epq is the second peak error detection value, Ebq is the second bottom error detection value, and Sq is a slope of the second error detection curve at a second zero crossing point between the second peak error voltage value and the second bottom error voltage value, $$\Delta Vq = c1 \times [(Vpq+Vbq)/2] + c2 \times [(Epq+Ebq)/2/Sq] \quad \text{(Equation 2)};$$

K) obtaining a third voltage value $Vi\_1$ based on Equation 3 and obtaining a fourth voltage value $Vq\_1$ based on Equation 4, where $Vi\_0$ is the first voltage value, $Vq\_0$ is the second voltage value, sign( ) is a sign function, and $\Delta Vfix$ is a step size of a voltage change, $$Vi\_1 = Vi\_0 + \text{Sign}(\Delta Vi) \times \Delta Vfix \quad \text{(Equation 3)}$$

$$Vq\_1 = Vq\_0 + \text{Sign}(\Delta Vq) \times \Delta Vfix \quad \text{(Equation 4)};$$

L) applying the second bias having the fourth voltage value to the second child modulator;
M) performing B), C), D), and E), in a state in which the second bias having the fourth voltage value is applied to the second child modulator, to obtain the first correction value as a third correction value;
N) applying the first bias having the third voltage value to the first child modulator;
O) performing G), H), I), and J), in a state in which the first bias having the third voltage value is applied to the first child modulator, to obtain the second correction value as a fourth correction value;
P) obtaining a first coefficient a and a second coefficient b based on Equation 5 and Equation 6, respectively, the first coefficient a representing an influence of a bias of the first child modulator on the second child modulator, and the second coefficient b representing an influence of a bias of the second child modulator on the first child modulator, $$a = \text{Sign}(\Delta Vq) \times (\Delta Vi - \Delta Vi\_1)/\Delta Vfix \quad \text{(Equation 5)}$$

$$b = \text{Sign}(\Delta Vi) \times (\Delta Vq - \Delta Vq\_1)/\Delta Vfix \quad \text{(Equation 6)};$$

Q) using the first coefficient a and the second coefficient b to obtain a first modified correction value $\Delta Vi\_2$ and a second modified correction value $\Delta Vq\_2$ based on Equation 7 and Equation 8, respectively, the first modified correction value $\Delta Vi\_2$ modifying the first correction value, and the second modified correction value $\Delta Vq\_2$ modifying the second correction value, $$\Delta Vi\_2 = (\Delta Vi - a\Delta Vq)/(1-ab) \quad \text{(Equation 7)}$$

$$\Delta Vq\_2 = (\Delta Vq - b\Delta Vi)/(1-ab) \quad \text{(Equation 8); and}$$

R) obtaining the first error detection value obtained when the voltage value of the first bias is equal to a voltage value obtained by adding the first modified correction value $\Delta Vi\_2$ to the voltage value of the first bias at the first zero crossing point, as a third error control value, and obtaining the second error detection value obtained when the voltage value of the second bias is equal to a voltage value obtained by adding the second modified correction value $\Delta Vq\_2$ to the voltage value of the second bias at the second zero crossing point, as a fourth error control value. The first bias is controlled so that the first error detection value measured by detecting the first frequency component included in the output of the optical modulator is the third error control value, and the second bias is controlled so that the second error detection value measured by detecting the second frequency component included in the output of the optical modulator is the fourth error control value. The frequency of the first frequency component is equal to the frequency of the first dither signal, and the frequency of the second frequency component is equal to the frequency of the second dither signal.

The above-described method [4] can determine the corrected bias voltage value in consideration with the influence given by the bias of the other child modulator to one child modulator to be measured, and can more accurately suppress the shift of the bias voltage from the optimum bias point due to the asymmetry of the modulator characteristic.

[5] An optical transmission module according to yet another aspect of the present disclosure is an optical transmission module includes a nested optical modulator in which a first child modulator and a second child modulator form two arms of a parent modulator; and a bias control circuit configured to control a bias voltage of the optical modulator. The bias control circuit includes a first bias generation circuit configured to apply, to the first child modulator, a first bias on which a first dither signal is superimposed, a synchronous detection unit configured to detect a first frequency component included in an output of the optical modulator, in a state in which local light is input to the optical modulator and a modulation signal is applied to the first child modulator together with the first bias on which the first dither signal is superimposed, to measure an error detection value, the first frequency component having a frequency equal to a frequency of the first dither signal, a correction bias voltage calculator configured to perform a process including:

A1) obtaining, based on a first error detection value that is the error detection value detected by the synchronous detection unit when a voltage value of the first bias is changed, a first error detection curve representing a relationship between the first error detection value and the voltage value of the first bias;

B1) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;

C1) obtaining a first correction value $\Delta Vi$ based on Equation 1, where Vp is the first peak error voltage value, Vb is the first bottom error voltage value, Ep is the first peak error detection value, Eb is the first bottom error detection value, c1 is a first weight value, c2 is a second weight value, and S is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1); and}$$

D1) obtaining the first error detection value that is obtained when the voltage value of the first bias is equal to a voltage value obtained by adding the first correction value $\Delta Vi$ to the voltage value the first bias at the first zero crossing point, as a first error control value, and a control signal generator configured to control the first bias so that the first error detection value is the first error control value, the first error detection value being measured by detecting the first frequency component included in the output of the optical modulator, the frequency of the first frequency component being equal to the frequency of the first dither.

With the above-described configuration, the shift of the bias voltage from the optimum bias point due to the asymmetry of the modulator characteristics can be suppressed.

[6] In [5], the optical transmission module further includes a photodetector configured to monitor optical power of light input to the optical modulator or output from the optical modulator. The bias control circuit corrects the first error control value based on $E=E0 \times (P/P0)$, where P is a value of the optical power based on a result of the monitoring of the photodetector, E is the first error control value, P0 is a reference value of the optical power, and E0 is the first error control value obtained when the value of the optical power is the reference value.

By providing the photodetector that monitors the power of the light input to the optical modulator or output from the optical modulator, even when the power of the light input to the optical modulator fluctuates, the bias voltage of the child modulator can be appropriately controlled during the bias control operation so as to conform to the fluctuation of the optical power to correct the first error control value.

[7] A bias control method according to another aspect of the present disclosure is a bias control method of a nested optical modulator in which a first child modulator and a second child modulator form two arms of a parent modulator, and the bias control method includes:

a) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;

b) obtaining a first error detection curve representing a relationship between the first error detection value and the voltage value of the first bias;

c) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;

m) using the first peak error detection value, the first bottom error detection value, the first peak error voltage value, and the first bottom error voltage value, to set a non-zero error value as a target, and using the non-zero error value as a first error control value to start bias control of the optical modulator;

n) controlling the first bias so that the first error detection value measured by detecting the first frequency component included in the output of the optical modulator is the first error control value, the frequency of the first frequency component being equal to the frequency of the first dither signal;

o) monitoring optical power of light input to the optical modulator or output from the optical modulator, in parallel to the control of the first bias, and correcting the first error control value based on $E=E0 \times (P/P0)$, where P is a value of the optical power based on a result of the monitoring, E is the first error control value, P0 is a reference value of the optical power, and E0 is the first error control value obtained when the value of the optical power is the reference value.

Even when the power of the light input to the optical modulator fluctuates, the bias voltage of the child modulator can be appropriately controlled during the bias control operation so as to conform to the fluctuation of the optical power to correct the first error control value.

Before describing a specific configuration and method of the embodiments, the technical problems resulting from typical bias control will be described in more detail with reference to FIGS. 1 to 4. The typical bias control is control that minimizes a dither component included in output light of an optical modulator.

Figure 1:
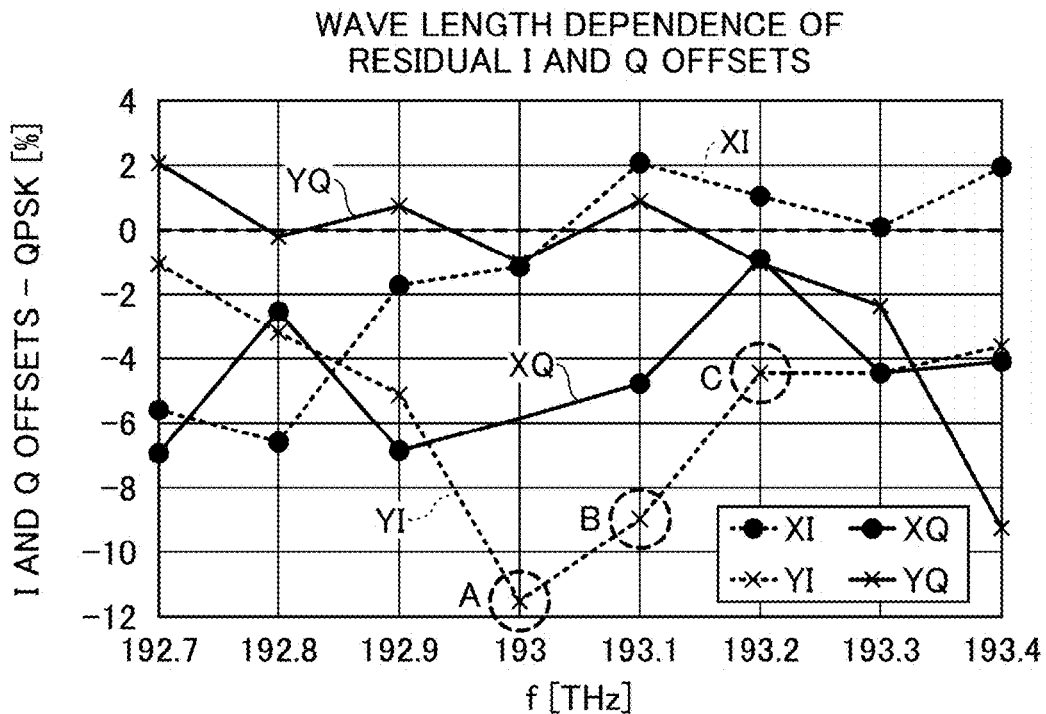
FIG. 1 is a graph depicting a technical problem of the present disclosure.

FIG. 1 indicates wavelength dependence of the residual offsets of I and Q arms with respect to each of the X polarization and the Y polarization. The residual offset indicates a shift (an offset) of the bias voltage still remaining in the optical modulator despite performing bias control using a dither. The residual offsets of the I and Q arms are expressed as a percentage (%) of the bias voltage shift relative to half-wave voltage Vn that is required to change light output power from minimum to maximum.

For each of the X polarization and the Y polarization, the residual offsets of the I and Q arms do not match, and the residual offsets change irregularly as the frequencies change. Focusing on the I-arm in the Y polarization, the residual offset changes significantly as the frequency changes to 193.0 THz, 193.1 THz, and 193.2 THz.

Figure 2A:
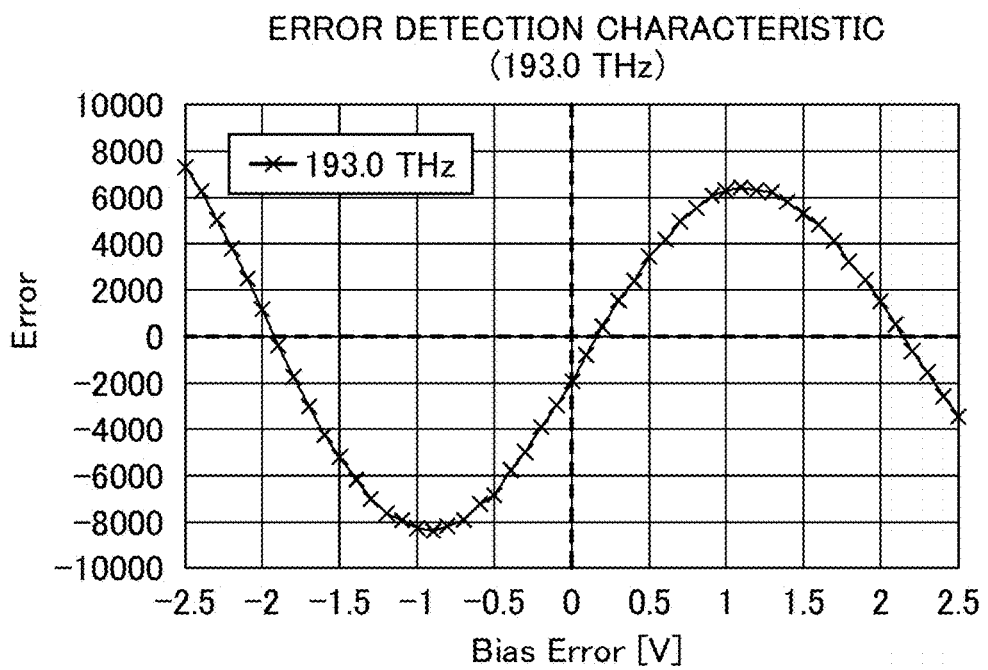
FIG. 2A is a graph indicating an error detection characteristic at a predetermined frequency.
Figure 2B:
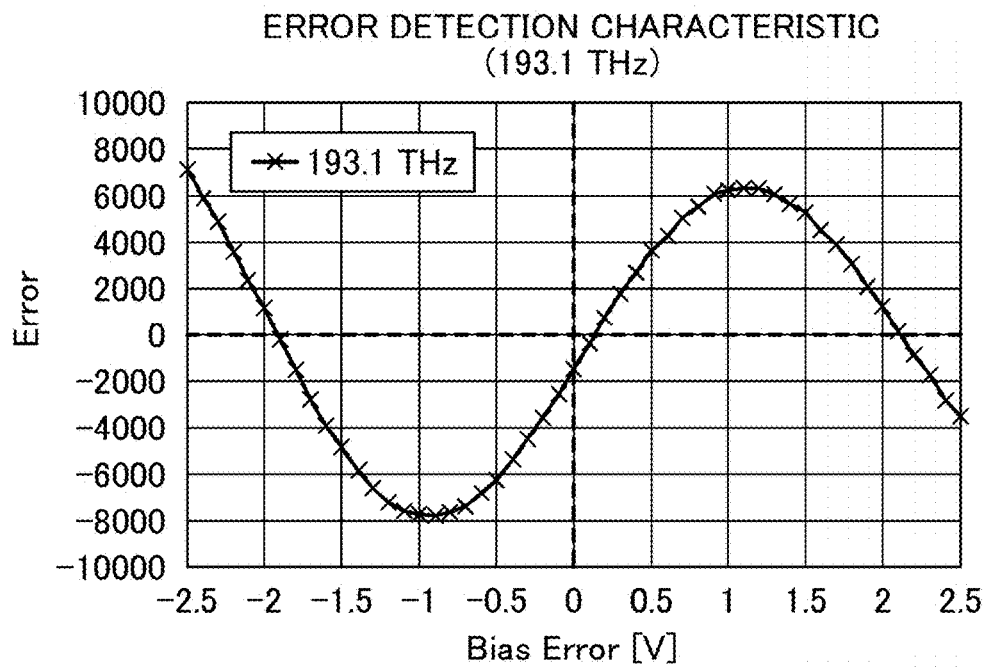
FIG. 2B is a graph indicating an error detection characteristic at a predetermined frequency.
Figure 2C:
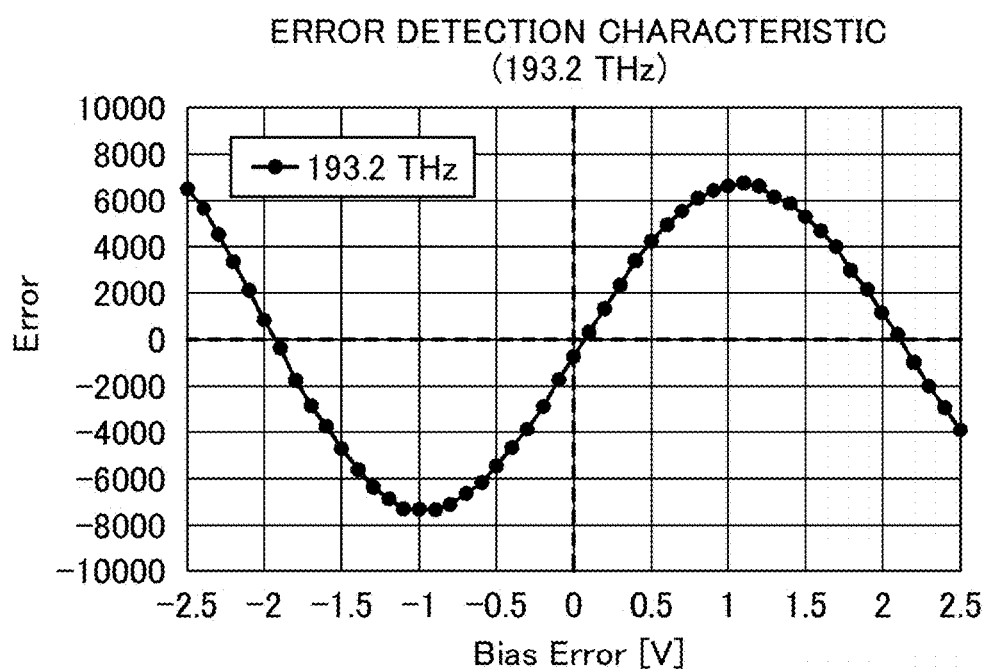
FIG. 2C is a graph indicating an error detection characteristic at a predetermined frequency.

FIGS. 2A, 2B and 2C indicate error detection characteristics of the points A, B, and C of FIG. 1. The error detection characteristics are expressed as error detection values with respect to bias voltage error. In FIGS. 2A to 2C, the total number of sampling points of the dither component detected by synchronous detection from the output light of the optical modulator is represented as error. At 193.0 THz in FIG. 2A, the bias voltage error observed when the output error is zero is about +0.2 V, and the error detection value in the vertical axis direction is shifted in the negative direction. At 193.1 THz in FIG. 2B, the bias voltage error observed when the output error is zero is closer to the origin than that in FIG. 2A, and the error in the vertical axis direction is also smaller. At 193.2 THz in FIG. 2C, the bias voltage error observed when the output error is zero approximately matches the origin. It can be seen that the asymmetry of the error detection characteristic increases under the condition where the residual offset is large (at the point A). The asymmetry of the error detection characteristic represents the asymmetry of the modulator characteristic.

Figure 3:
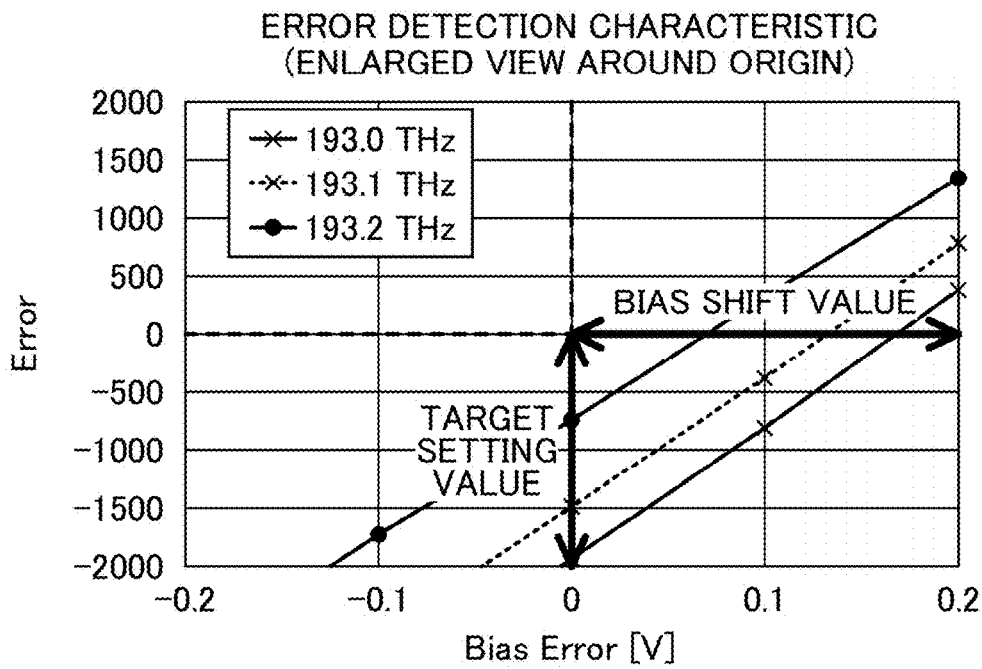
FIG. 3 is a graph indicating an error detection characteristic near the origin.

FIG. 3 is an enlarged view of the vicinity of the origin indicating the error detection characteristics of FIGS. 2A to 2C. The error detection characteristic at the point A, where the residual offset is large, is farthest away from the origin. Here, the shift of the error detection characteristic in the horizontal axis direction indicates a bias voltage shift, and the shift in the vertical axis direction indicates a target setting value that causes the detected dither component to be zero.

From the results in FIGS. 1 to 3, we arrive at the technical concept of the present disclosure that the residual offset that can be generated during the ABC operation can be suppressed by measuring the error detection characteristic of the optical modulator in advance and determining an appropriate corrected bias voltage value to compensate for the error due to the asymmetry of the modulator characteristic. The usefulness of this bias control method can also be depicted in FIG. 4.

Figure 4:
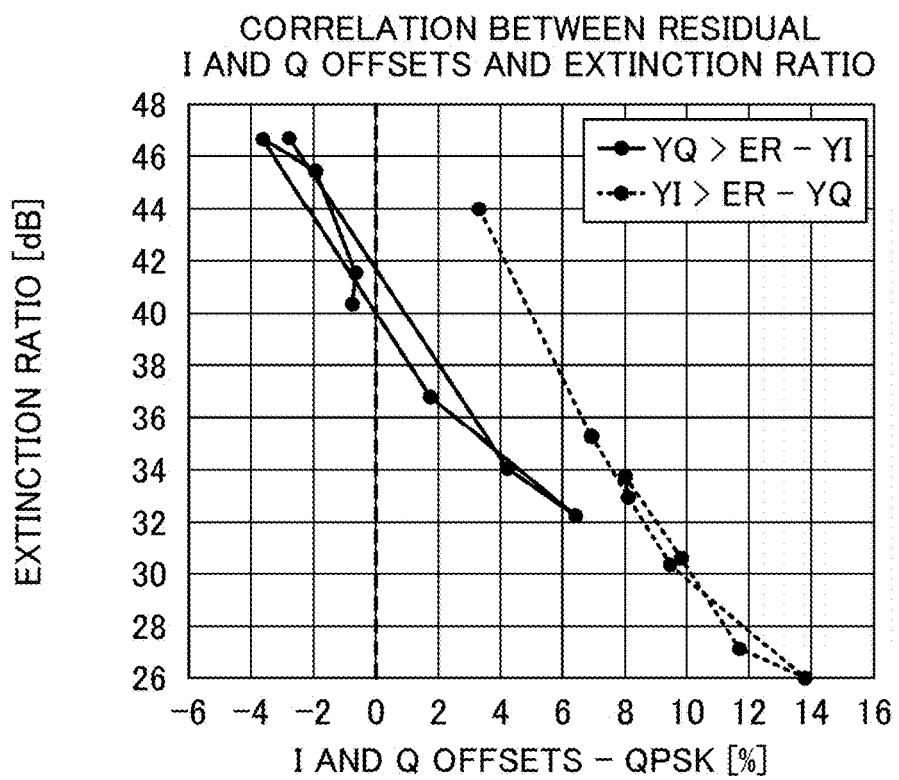
FIG. 4 is a graph indicating a relationship between residual offsets and an extinction ratio.

FIG. 4 indicates a relationship between the residual offsets of the I and Q arms and the extinction ratio (ER). If the modulator characteristic is perfectly symmetric, the residual offsets of the I and Q arms become zero by simply controlling the detected error (or the dither component) such that the detected error is zero. However, the asymmetry of the actual modulator characteristic causes the residual offset to be generated even when the error is controlled such that the error is zero. As indicated in FIG. 4, because the residual offset does not correlate simply to the extinction ratio, it is difficult to compensate for the residual offset with a simple correction equation or a table. In addition, the residual offset significantly changes with small wavelength changes (see FIG. 1). The residual offset may also change depending on a modulation scheme and driving voltage. Wavelength changes and driving voltage fluctuations also contribute to the asymmetry of the modulator characteristic. The bias control method of the present disclosure determines the corrected bias voltage value in consideration with the asymmetry of the modulator characteristic.

First Embodiment

Figure 5:
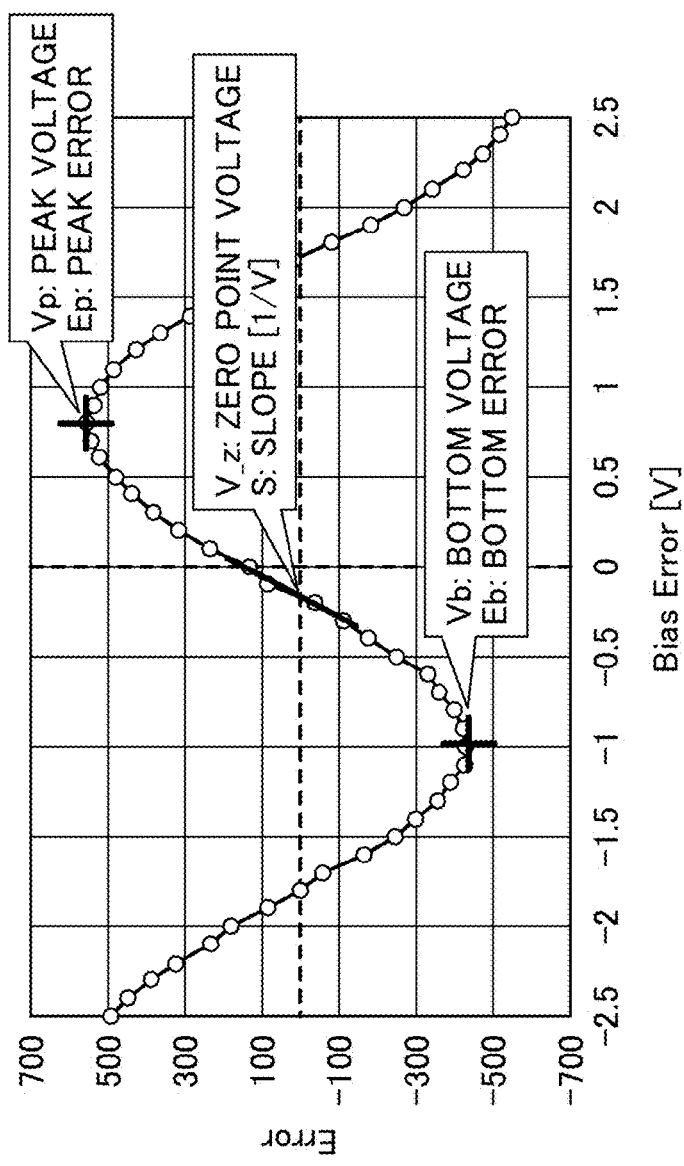
FIG. 5 is a drawing depicting a basic concept of a bias control method according to a first embodiment.

FIG. 5 is a graph depicting a basic concept of a bias control method according to a first embodiment. The present disclosure controls bias voltage of a nested optical modulator in which a parent modulator is formed of a child modulator of the I-arm (a first child modulator) and a child modulator of the Q-arm (a second child modulator).

The graph of FIG. 5 indicates an error detection curve. The error detection curve is obtained with local light being input to the optical modulator. The error detection curve is obtained by superimposing a dither signal on a DC bias applied to a child modulator to be measured (e.g., the child modulator of the I-arm) and synchronously detecting the dither component included in output light of the parent modulator with the dither signal while changing a bias voltage value within a predetermined range. Here, the error detection curve is obtained in a state in which a transmitted data signal is input to the optical modulator. Because the modulated signal changes faster than the ABC control, a value obtained by averaging the transmitted data signals is output as the error. Here, the "dither signal" is a low frequency signal superimposed on a bias voltage to modulate the bias voltage with a small amplitude. The "small amplitude" is an amplitude of, for example, several mV to 20 mV. "Low frequency" is a frequency of about 10 Hz to 100 Hz that is sufficiently low in comparison with the drive amplitude of the optical modulator.

As an example, the dither component is synchronously detected while changing the bias voltage applied to the I-arm at a step size of 0.1 V (hereinafter referred to as "I bias", appropriately) in the range of −2.5 V to ±2.5 V. At this time, a suitable DC bias is applied to another child modulator (e.g., the child modulator of the Q-arm) at a fixed value. An error detection value of the observed dither component is a value in the vertical axis. When the dither signal and the detected dither component are in phase, the error detection value is positive, and when the dither signal and the detected dither component are in reverse phase, the error detection value is negative. The value in the vertical axis itself may change depending on the frequency of the dither signal that is used, the sampling rate, and the like, but the trend of the change of the error detection curve is the same.

Different dither frequencies may be used for the I-arm and the Q-arm. Additionally, in the measurement of the error detection curve prior to the actual operation of the optical modulator, a dither signal having an amplitude that is several times greater than the amplitude of the dither of the actual ABC operation may be used to increase the sensitivity of the error detection. Adjustment of the dither amplitude value will be described later.

The point where the bias voltage error is 0 V in the horizontal axis is the bias voltage that would be the optimal bias without the dither component being detected. However, when the error detection curve is measured, the error is generated at the point where the bias voltage error is 0 V. Conversely, a zero crossing point, i.e., zero point voltage V_z observed when the error detection value is zero, is shifted from a voltage value that would be the optimal bias. In the present disclosure, the bias voltage error is corrected based on the degree of the asymmetry of the error detection curve to obtain the appropriate corrected bias voltage value V_c.

The corrected bias voltage value V_c according to the first embodiment is obtained by correcting the zero point voltage V_z by using both the bias voltage error and the error detection value. The bias voltage error includes a peak error voltage value Vp that is the bias voltage error observed when the error detection value is maximized, and a bottom error voltage value Vb that is the bias voltage error observed when the error detection value is minimized. The error detection value includes a peak error detection value Ep and a bottom error detection value Eb.

The corrected bias voltage value V_c is given by Equation (I).

$$\begin{aligned} V\_c &= V\_z + \Delta V \\ &= V\_z + c1 \times [(Vp + Vb)/2 - V\_z] + \\ &\quad c2 \times [(Ep + Eb)/2/S] \end{aligned} \qquad \text{Equation (I)}$$

Here, ΔV is a correction value of the error due to the asymmetry of the modulator characteristic and is expressed by a first correction term [(Vp+Vb)/2−V_z] and a second correction term [(Ep+Eb)/2/S]. Based on Equation (I), a correction value ΔVi of the I bias error and a correction value ΔVq of the Q-bias error are expressed by Equation 1 and Equation 2, respectively.

$$\Delta Vi = c1 \times [(Vp+Vb)/2] + c2 \times [(Ep+Eb)/2/S] \qquad \text{Equation 1}$$

$$\Delta Vq = c1 \times [(Vpq+Vbq)/2] + c2 \times [(Epq+Ebq)/2/Sq] \qquad \text{Equation 2}$$

The correction value ΔVi of the I bias error is determined based on the peak error voltage value Vp, the bottom error voltage value Vb, the peak error detection value Ep, the bottom error detection value Eb of the error detection curve obtained from detection results of a first dither component having a frequency equal to the frequency of a first dither signal superimposed on the bias voltage applied to the I-arm, and a slope S of the error detection curve at the zero-bias point. The correction value ΔVq of the Q-bias error is determined based on a peak error voltage value Vpq, a bottom error voltage value Vbq, a peak error detection value Epq, a bottom error detection value Ebq of the error detection curve obtained from detection results of a second dither component having a frequency equal to the frequency of a second dither signal superimposed on the bias voltage applied to the Q-arm, and a slope Sq of the error detection curve at the zero-bias point.

The first correction term of Equation (I) corrects the asymmetry of the error detection curve representing the modulator characteristic in the horizontal axis direction. The first correction term is obtained by subtracting the zero point voltage V_z from an average value of the peak error voltage value Vp and the bottom error voltage value Vb along the horizontal axis.

The second correction term corrects the asymmetry of the error detection curve in the vertical axis direction. "S" used in the second correction term is the slope of the error detection curve at the zero crossing point between the peak error detection value and the bottom error detection value, as described above. The reason why the average value of the peak error detection value Ep and the bottom error detection value Eb is further divided by the slope S is to convert the error detection value to a voltage value.

A first weight value c1 and a second weight value c2 that are respectively multiplied by the first correction term and the second correction term may be a value of 1, or may be appropriate fractional values weighting the first correction term and the second correction term. By setting appropriate values as the first weight value c1 and the second weight value c2 based on the asymmetry of the error detection curve, the error due to the asymmetry of the modulator characteristic can be corrected more accurately.

Conventional bias control using a dither is a correction that simply brings the zero point voltage V_z to the origin (0 V). With respect to this, the corrected bias voltage value V_c according to the first embodiment is calculated by using both the bias voltage error in the horizontal axis direction and the error detection value in the vertical axis direction. By doing so, bias control that compensates for the asymmetry of the modulation characteristic inherent in the optical modulator is performed. Here, when the corrected bias voltage value V_c of one of the child modulators (e.g., the child modulator of the I-arm) is determined, the error detection curve is similarly measured by the other child modulator (e.g., the child modulator of the Q-arm) to determine the corrected bias voltage value V_c of the Q-arm based on Equation (I). Additionally, a correction error value Err observed when the corrected bias voltage value V_c is applied as the bias voltage for each of the I-arm and the Q-arm is measured. As described later, the correction error value is used as an error control value to control the bias voltage of each arm so that a detected value of the dither component of each arm included in the output of the optical modulator approaches the error control value.

[Configuration Example of an Optical Transmission Module]

Figure 6:
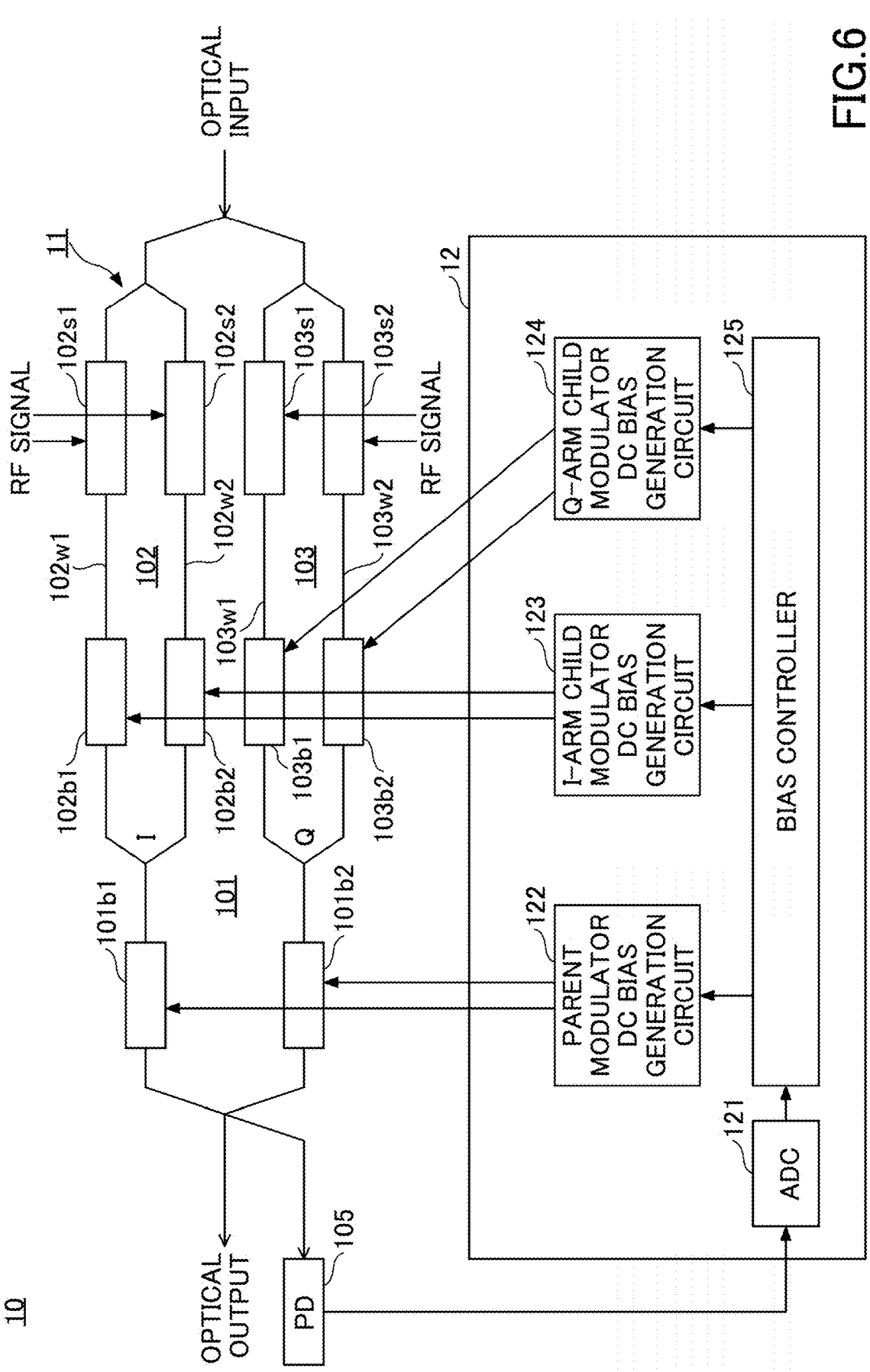
FIG. 6 is a schematic diagram of an optical transmission module according to the embodiment.

FIG. 6 is a schematic diagram of an optical transmission module 10 to which the bias control of FIG. 5 is applied. The optical transmission module 10 modulates local light input from a light source, such as a wavelength variable laser diode, with a transmission data signal, to output modulated output light. The optical transmission module 10 includes an optical modulator 11 and an ABC control circuit 12 that performs automatic bias control on the optical modulator 11. The optical modulator 11 is a nested optical modulator in which two child modulators 102 and 103 are connected in parallel to form a parent modulator 101. In the example of FIG. 6, the child modulator 102 is the I-arm of the parent modulator 101 and the child modulator 103 is the Q-arm.

in the optical modulator 11 of FIG. 6, optical modulation, such as quadrature phase shift keying (QPSK) or quadrature amplitude modulation (QAN), is performed, but two parent modulators 101 may be tandemly connected to perform modulation of the dual polarization (DP) QPSK method. In such a case, the bias control of FIG. 5 is performed on each of the optical modulator for the X polarization and the optical modulator for the Y polarization.

A portion of the output light of the optical modulator 11 is branched and monitored by a photodetector 105, such as a photodiode (PD), and an analog monitor signal is supplied to the ABC control circuit 12. The ABC control circuit 12 includes an analog-to-digital converter (hereinafter referred to as "ADC") 121, a DC bias generation circuit 122 for the parent modulator 101, a DC bias generation circuit 123 for the child modulator 102, a DC bias generation circuit 124 for the child modulator 103, and a bias controller 125. The bias controller 125 may be implemented by using a digital processor. In FIG. 6, the DC bias generation circuits 122, 123, and 124 are depicted as DC bias generation circuits for Y polarization, but DC bias for X polarization is generated when X polarization is processed.

The I-arm child modulator 102 includes electrodes 102b1 and 102b2 for DC bias application and signal electrodes 102s1 and 102s2 for transmission data signal input on two respective waveguides 102w1 and 102w2 constituting the MZM. Additionally, the Q-aim child modulator 103 includes electrodes 103b1 and 103b2 for DC bias application and signal electrodes 103s1 and 103s2 for transmission data signal input on two respective waveguides 103w1 and 103w2 constituting the MZM. The parent modulator 101 includes electrodes 101b1 and 101b2 for DC bias application. The DC bias for the parent modulator 101 is a bias voltage providing a phase difference of π/2 radians between the I-arm and the Q-arm. The bias control of the embodiment primarily relates to DC bias control of the child modulators 102 and 103.

Figure 7:
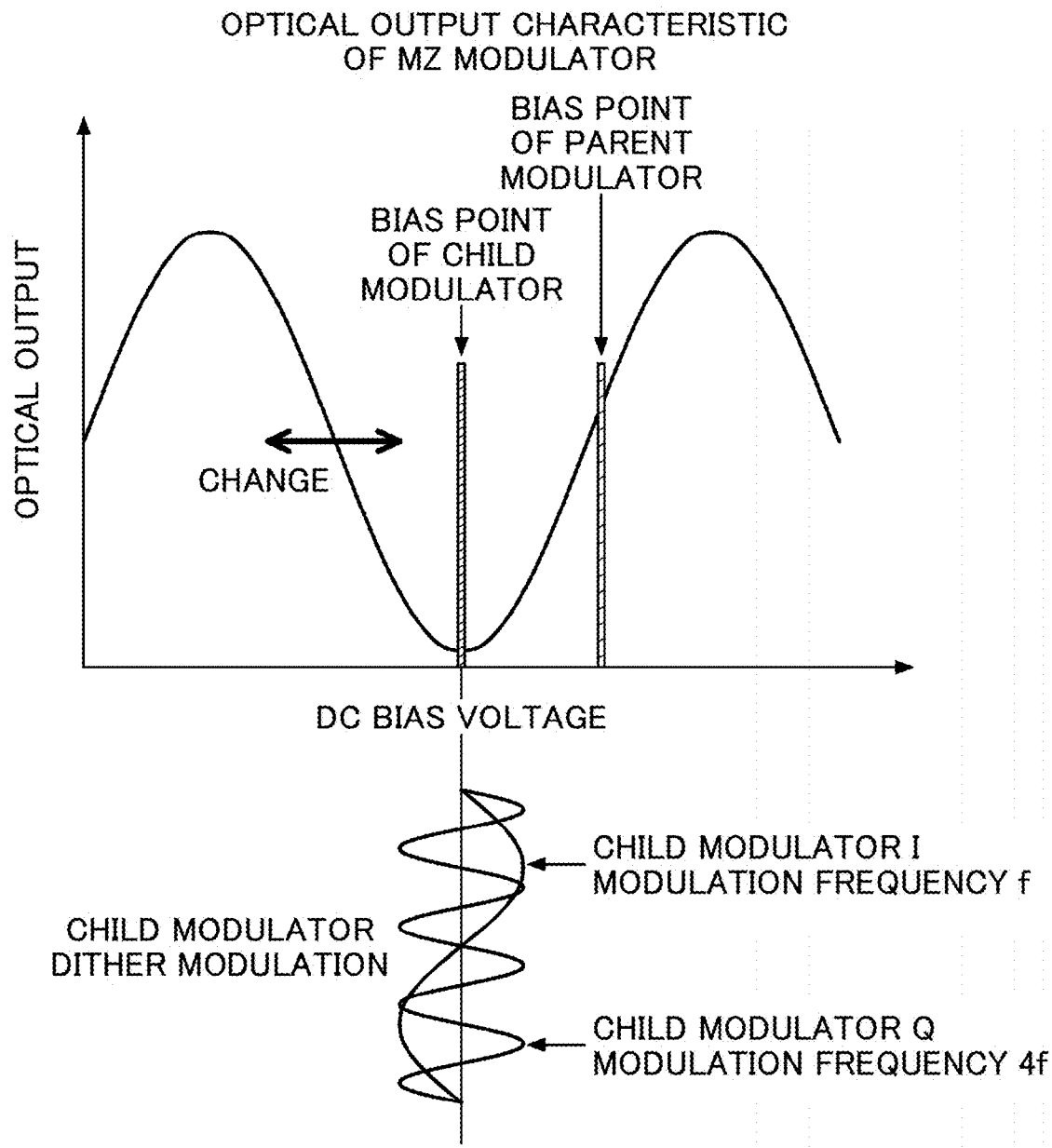
FIG. 7 is a drawing illustrating an example of dither modulation of a bias voltage of a child modulator.

FIG. 7 illustrates an example of dither modulation of bias voltage for the child modulator. In this example, the optimum point of the DC bias voltage is controlled to be in a valley of the voltage vs. optical output power characteristic curve (also referred to as a modulation curve). In the following description, the "bias voltage" indicates the DC bias voltage unless otherwise noted. Because the modulation curve changes over time or changes environmentally depending on the influence of the temperature or the like, feedback control is performed by the ABC control circuit 12 to always apply the optimum bias.

As an example, a dither signal having a frequency f is superimposed on the bias voltage of the I-arm child modulator 102, and a dither signal having a frequency 4f is superimposed on the bias voltage of the Q-arm child modulator 103. The dither signals are superimposed, so that the bias voltage is modulated by a small amplitude. The bias point of the child modulator 102 is controlled, for example, by extracting a dither component having the frequency f from the output light (a signal detected by the photodetector 105) of the optical modulator 11 as the error. Additionally, the bias point of the child modulator 103 is controlled, for example, by extracting a dither component having the frequency 4f from the output light (the signal detected by the photodetector 105) of the optical modulator 11 as the error. The bias point of the parent modulator 101 may be controlled, for example, by extracting a beat component (e.g., 4f−f=3f) of the dither for the I-arm and the dither for the Q-arm from the output light (the signal detected in the photodetector 105) of the optical modulator 11 as the error.

Figure 8:
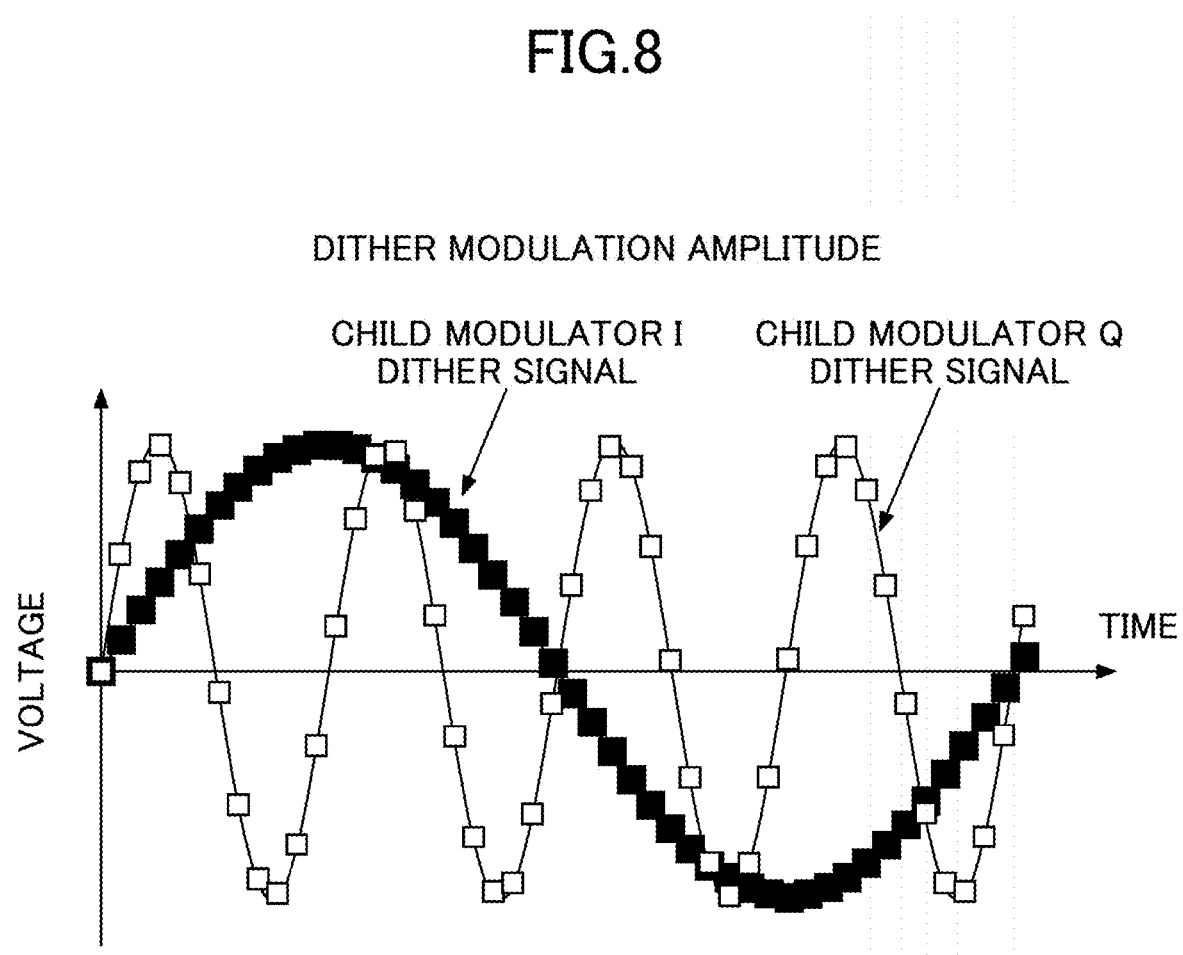
FIG. 8 is a graph indicating an example of a dither waveform.

FIG. 8 illustrates an example of a dither waveform. In this example, the sampling time is 2 milliseconds. The dither frequency f in the I-arm is 10.4 Hz and 48 points are sampled per period. The dither frequency 4f in the Q-aim is 42.7 Hz and 12 points are sampled per period. The frequency of the beat component of the dither for the I-arm and the dither for the Q-arm is 31.3 Hz and 16 points are sampled per period.

[Bias Control Configuration]

Figure 9:
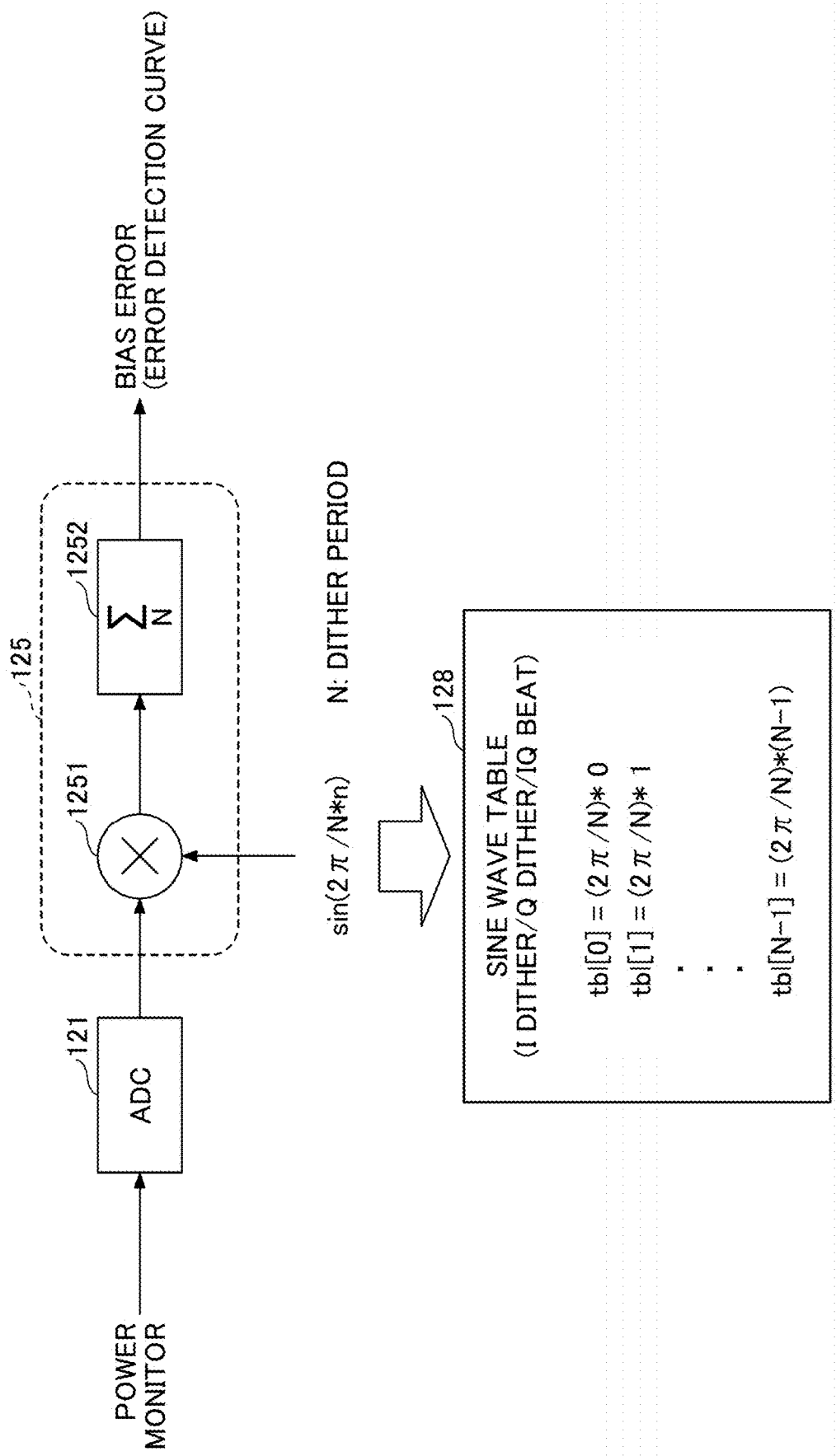
FIG. 9 is a drawing depicting error detection of an ABC controller.

FIG. 9 is a drawing depicting error detection performed by the ABC control circuit 12. An analog current output from the photodetector 105 is input to the ADC 121 of the ABC control circuit 12 as a power monitor signal. The input power monitor signal is digitally sampled by the ADC 121, for example, in the sampling period illustrated in FIG. 8. Data for each sampling point is input to a multiplier 1251 of the bias controller 125.

The bias controller 125 refers to a sine wave table 128 and inputs a corresponding value of the dither signal superimposed on the I-arm bias voltage to the multiplier 1251 in synchronization with the digital sampling timing. The sine wave table 128 records dither waveforms for the I-arm, Q-arm, and the parent modulator 101. The dither signal used for error detection of the I-arm has 48 values as the sampling number N. By the multiplier 1251 multiplying the digital sampling value by the value of the dither signal of the sine wave table 128, an error component included in the power monitor signal is synchronously detected.

The sine wave table 128 may be stored in an internal memory of the ABC control circuit 12 or stored in a memory external to the ABC control circuit 12. Results of the synchronous detection are summed by a summator 1252 and the bias error is output for each period. When measuring the error detection curve prior to the actual ABC control, the error detection curve is obtained from the output of the summator 1252.

Figure 10:
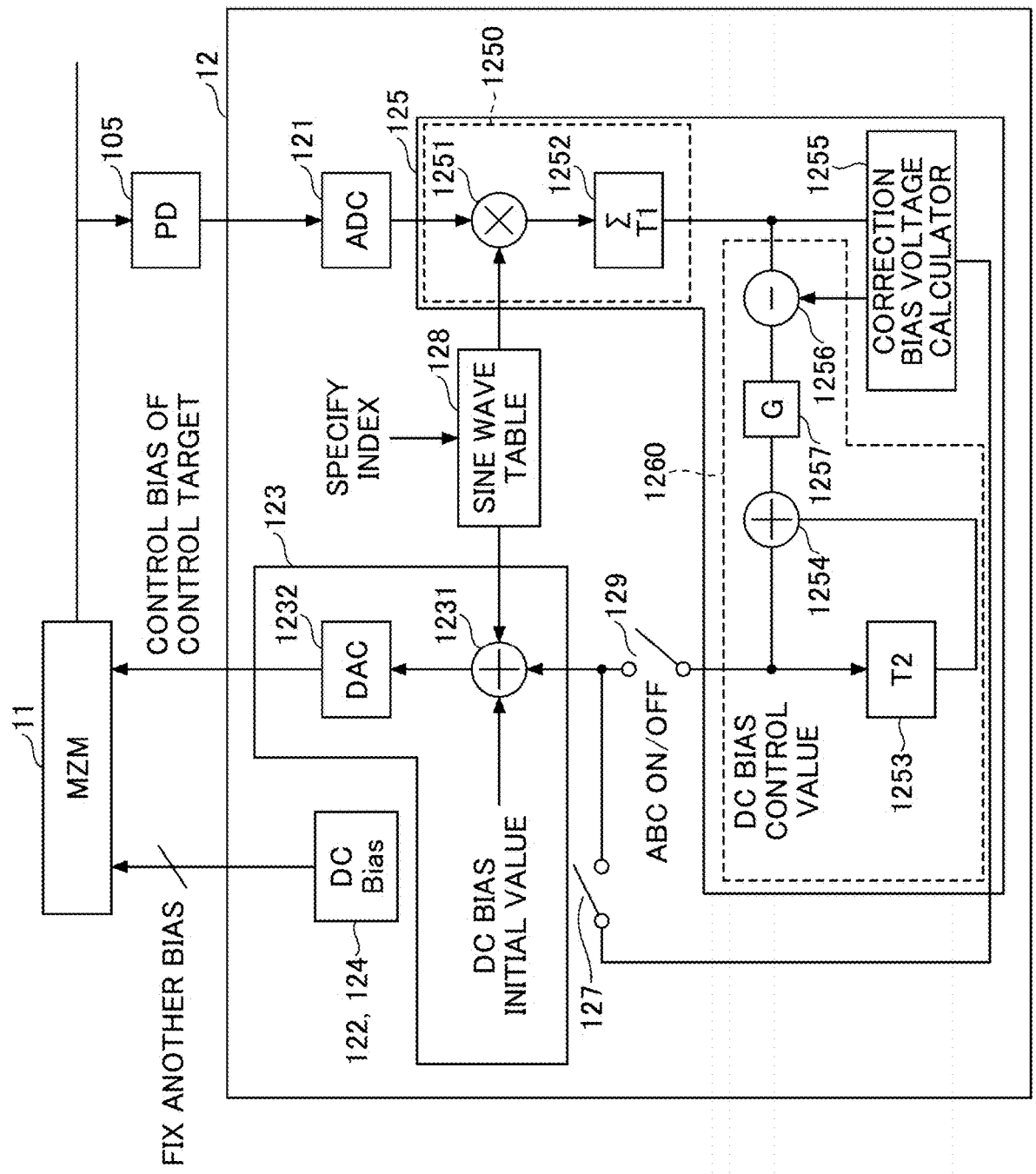
FIG. 10 is a diagram depicting an operation of the ABC controller.

FIG. 10 is a diagram depicting an operation of the ABC control circuit 12. The bias controller 125 and each of the DC bias generation circuits 122, 123, and 124 are connected through switches 127 and 129. In performing the ABC control, the switch 127 is turned off (opened) and the switch 129 is turned on (closed).

When measuring the error detection curve of the child modulator to determine the appropriate corrected bias voltage value V_c prior to the actual operation of the optical modulator 11, the switch 127 is turned on (closed) and the switch 129 is turned off (opened). At this time, another bias voltage not to be measured is fixed.

For example, when obtaining the corrected bias voltage value V_c of the I-arm child modulator 102, the switch 127 between the DC bias generation circuit 123 and the bias controller 125 is turned on and the switch 129 is turned off. Additionally, the switch 127 between each of the bias generation circuit 122 and the bias generation circuit 124 and the bias controller 125 is turned on and the switch 129 is turned off. A correction bias voltage calculator 1255 of the bias controller 125 fixes the bias voltage of the Q-arm child modulator 103 and the parent modulator 101 to a predetermined value.

A portion of the output light of optical modulator 11 is monitored by the photodetector 105 and digitally sampled by the ADC 121 to be input to the multiplier 1251. The dither waveform and the sampling number N to be used in the sine wave table 128 are specified. A digital signal value of the specified dither waveform is multiplied by a digital sampling value of the monitored light and the dither component is synchronously detected. The summator 1252 sums results for one period as an error detection result. Here, the multiplier 1251 and the summator 1252 may be collectively referred to as a synchronous detection unit 1250.

The error detection result is supplied to the correction bias voltage calculator 1255. In the correction bias voltage calculator 1255, the corrected bias voltage value V_c of the I-arm is calculated based on Equation (I). The corrected bias voltage value V_c is the sum of the zero point voltage V_z that reduces the error detection value to zero, and the correction value Vi that corrects the I bias error due to the asymmetry of the modulator characteristic. Additionally, the correction bias voltage calculator 1255 records the error when the corrected bias voltage value V_c is applied from the DC bias generation circuit 123 as the correction error value Err.

In the bias controller 125, the error detection result is input to a subtractor 1256. The subtractor 1256 subtracts the correction error value Err input from the correction bias voltage calculator 1255 from the error detection result. A result obtained by subtracting the correction error value Err from the error detection result is amplified by the amplifier 1257. The amplified results are summed by the adder 1254 and a delay element 1253 to provide a DC bias control value. Here, the subtractor 1256, the amplifier 1257, the adder 1254, and the delay element 1253 may be collectively referred to as a control signal generator 1260. The correction error value Err or the DC bias control value for I bias may be referred to as a "first error control value $E_1$".

During the actual operation of the optical modulator 11, the switch 127 is turned off (opened), the switch 129 is closed, and the ABC control is performed. The adder 1231 of the DC bias generation circuit 123 adds up the DC bias control value from the bias controller 125, the dither signal for the I-arm from the sine wave table 128, and a DC bias initial value. The bias voltage on which the dither signal is superimposed is converted to an analog voltage at the DAC 1232 and applied to the child modulator 102 of the I-arm of the optical modulator 11. During the operation of the optical modulator 11, the monitoring of the modulator output and the feedback of the error detection results to the bias voltage are performed in a control loop formed by the switch 129 being turned on.

The feedback controls the error detection value to be the correction error value Err (the first error control value $E_1$). Thus, the corrected bias voltage value V_c is applied from the DC bias generation circuit 123 to the I-arm of the optical modulator 11. As the DC bias of the I-arm, the corrected bias voltage value V_c obtained by considering the asymmetry of the modulator characteristic is set, so that the accuracy of the bias control is improved, and the shift from the optimum bias point, that is, the residual offset, is suppressed. With respect to the Q-arm, substantially the same operation is performed, and the error detection value is controlled to be the correction error value Err (the second error control value $E_Q$), so that the shift from the optimum bias point (the residual offset) is suppressed.

[Bias Control Flow]

FIG. 11 is a flowchart of control performed by the ABC control circuit 12. In the control described herein, first, a child modulator to be measured is the child modulator 102 of the I-arm, and a child modulator not to be measured is the child modulator 103 of the Q-arm. Next, the child modulator to be measured is the child modulator 103 of the Q-arm, and the child modulator not to be measured is the child modulator 102 of the I-arm. A predetermined bias voltage value Vq_0 is applied to the child modulator not to be measured (e.g., the child modulator 103 of the Q-arm) (S11). The bias voltage value Vq_0 is referred to as a "second voltage value". The second voltage value may be, for example, a design value, an initial setting value of the ABC operation, or the like.

The I bias on which the first dither signal is superimposed is applied to the child modulator to be measured (e.g., the child modulator 102 of the I-arm), the error detection value of the frequency component (the first dither component) that is equal to the frequency of the first dither signal and that is included in the output light of the optical modulator 11 is measured, with changing the voltage value of the I bias within a predetermined range (S12). When the I bias is Vi, Vi changes in a predetermined step size between the minimum voltage value Vi_1 and the maximum voltage value Vi_h.

The error detection curve representing a relationship between the error detection value and the voltage change is obtained, and the correction value ΔVi is obtained from the error detection curve based on Equation 1 described below (S13).

$$\Delta Vi = c1 \times [(Vp+Vb)/2] + c2 \times [(Ep+Eb)/2/S] \quad \text{Equation 1}$$

The error detection curve and the correction value ΔVi are obtained as described with reference to FIG. 5. Step S13 corresponds to step b), step c), and step d) in the method of [1] above. Next, the first corrected bias voltage value Vi_c is obtained based on Equation (I), and the first error detection value obtained when the voltage value of the I bias is equal to the first corrected bias voltage value Vi_c is obtained as the first error control value $E_I$ (S14). The first corrected bias voltage value Vi_c is a voltage value obtained by adding the correction value ΔVi to the zero point voltage V_z of the I bias voltage at the zero crossing point of the error detection curve.

Next, similar measurement is performed in the Q-arm. A predetermined bias voltage value Vi_0 is applied to the child modulator 102 of the I-arm, and the processes substantially the same as steps S12 and S13 are performed on the child modulator 103 of the Q-arm to determine the correction value ΔVq of the error due to the asymmetry of the error detection curve based on Equation 2 (S15).

$$\Delta Vq = c1 \times [(Vpq+Vbq)/2] + c2 \times [(Epq+Ebq)/2/Sq] \quad \text{Equation 2}$$

The fixed bias voltage Vi_0 set in the I-arm when the Q-arm is measured is referred to as a "first voltage value". The first voltage value may be a design value, an initial setting value of the ABC operation, or the like. Additionally, the first voltage value may be the first corrected bias voltage value Vi_c determined in step S13. Step S15 corresponds to steps f) through j) in the method of [2].

Based on Equation (I), a voltage value (the second corrected bias voltage value Vq_c) obtained by adding the correction value ΔVq to the zero point voltage V_z of the Q-bias at the zero crossing point is obtained, and the second error detection value obtained when the voltage value of the Q-bias is equal to the second corrected bias voltage value Vq_c is obtained as the second error control value $E_Q$ (S16). Next, the I bias is controlled so that the first error detection value measured by detecting the first dither component from the optical modulator output is the first error control value $E_1$. Additionally, the Q-bias is controlled so that the second error detection value measured by detecting the second dither component (the frequency component having a frequency equal to the frequency of the second dither signal superimposed on the Q-bias) from the optical modulator output is the second error control value $E_Q$ (S17).

Even when the modulator characteristic is asymmetric due to differences in the extinction ratio and the optical loss between the I-arm and the Q-arm, the manufacturing error, the wavelength change, the driving amplitude change, and the like, the shift from the optimum bias point can be suppressed by the control method illustrated in FIG. 11.

[Effect Confirmation]

Figure 12A:
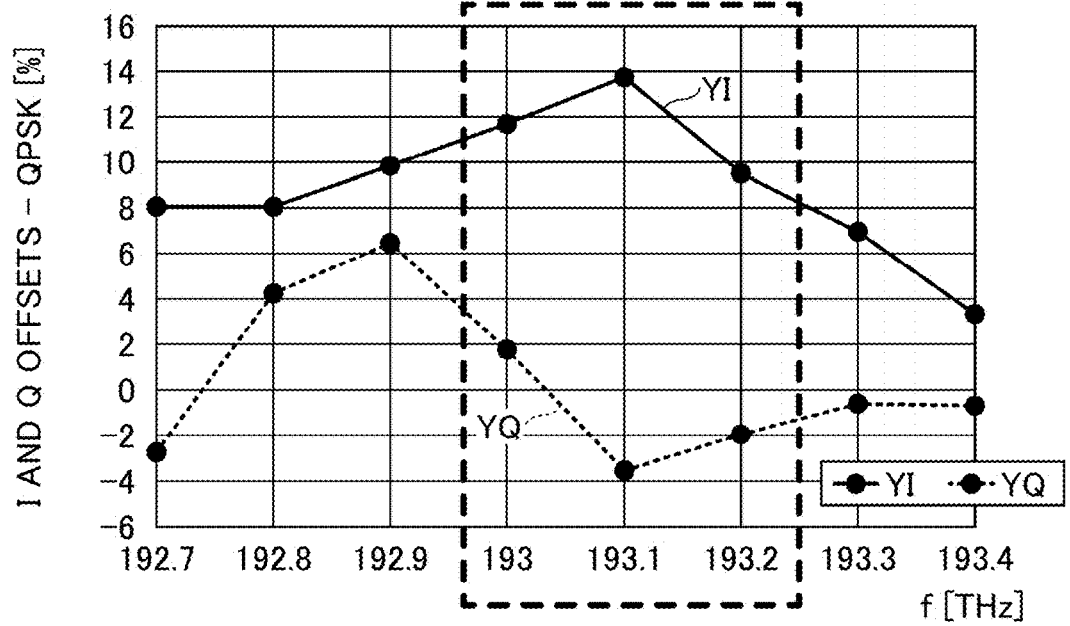
FIG. 12A is a graph of residual I and Q offsets that occur in general bias control using dither.
Figure 12B:
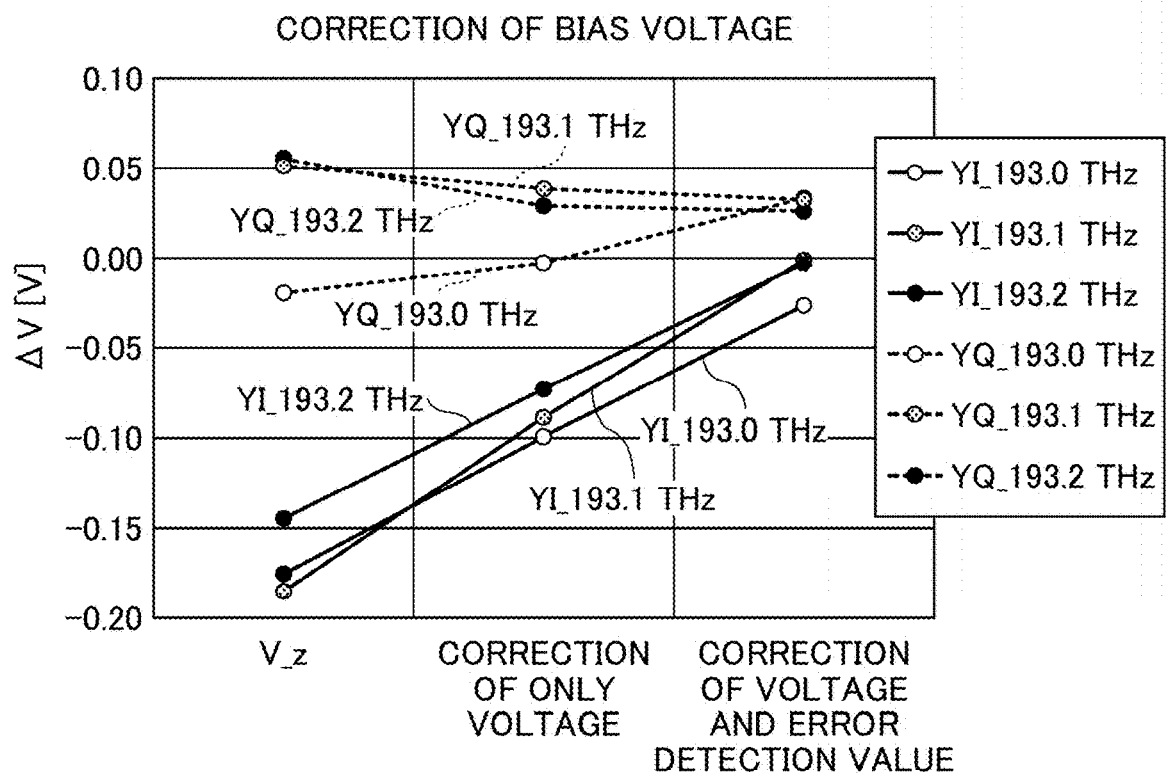
FIG. 12B is a graph illustrating the improvement of the bias voltage shift according to a correction method of the first embodiment.

FIG. 12A and FIG. 12B are graphs depicting the effect of the bias control according to the first embodiment.

FIG. 12A indicates results of measuring the offsets of the I-arm and the Q-arm of the optical modulator for the Y polarization when only the ABC operation is performed, that is, when no bias correction is performed. The offsets of the I-arm and Q-arm of the optical modulator are measured by inputting the QPSK signal.

At frequencies 193.0 THz, 193.1 THz, and 193.2 THz within the dashed rectangle of FIG. 12A, the residual offsets significantly change in both the I-arm and the Q-arm. Thus, focusing on this frequency band, the bias voltages of the I-arm and Q-arm of the optical modulator for the Y polarization are corrected.

FIG. 12B indicates results of measuring the bias voltage when the bias correction is not performed, when the asymmetry of the voltage is corrected, and when the asymmetry of the voltage and the error detection value are corrected. In FIG. 12B, in the conventional bias control that corrects only the zero point voltage V_z, the error due to the asymmetry of the modulator characteristic, i.e., the bias voltage shift from the optimum bias point, remains in both the I-arm and the Q-arm. The bias voltage shift is expressed as the correction value ΔV of the error. Especially in the I-arm, large error remains at all three frequencies.

When only the bias voltage error is corrected in addition to the zero point voltage V_z, the error due to the asymmetry is improved. The correction of only the bias voltage error is the correction of only the asymmetry of the voltage in the horizontal axis direction (the first correction term) in FIG. 5. In addition to the zero point voltage V_z, the correction of both the bias voltage error and the error detection value further reduces the error remaining in the bias control. The correction uses the first correction term that corrects the asymmetry of the voltage in FIG. 5 and the second correction term that corrects the asymmetry of the error detection value.

The bias correction of the first embodiment is performed, so that the bias voltage converges at or near the optimum bias point at all three frequencies in both the I-arm and the Q-arm. The maximum bias voltage shift of 185 mV is reduced to 33 mV. When the bias voltage shift is converted to the residual offset, the residual offset is calculated by 80×(bias voltage shift) [%/V], so that the bias voltage shift of up to 33 mV is the residual offset of 2.6% or less. Regardless of the differences in the extinction ratio between the I-arm and the Q-arm, the manufacturing error, the frequency change, and the like, the control to the appropriate bias point is achieved.

Figure 13:
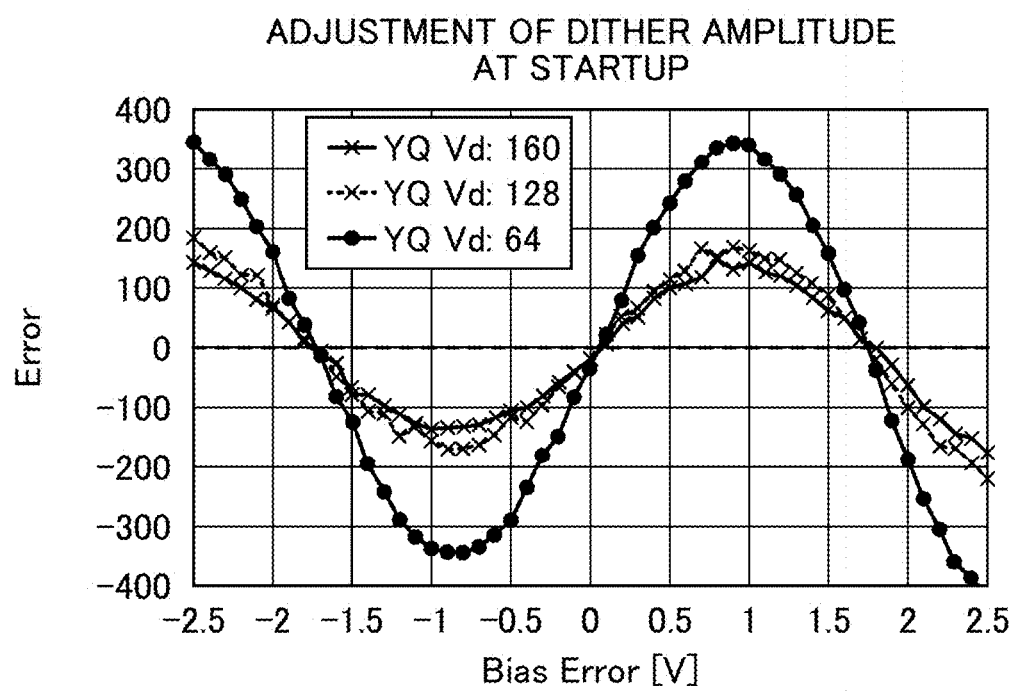
FIG. 13 is a graph depicting an adjustment of dither amplitude at startup.

FIG. 13 is a graph depicting adjustment of the dither amplitude at startup. Prior to the actual ABC control of the optical modulator, the dither amplitude may be set to be greater than a dither signal amplitude used in actual ABC control to increase the measurement accuracy of the error detection curve. In this example, a dither having an amplitude three times greater than the amplitude used in the actual ABC control is used.

"Vd" in the graph represents a digital input value of the dither signal. The amplitude of the dither signal is a reciprocal of Vd (1/Vd). In the actual ABC operation, the input value of the dither setting is set to Vd=160. The amplitude of the dither is preferably smaller so that the dither does not affect the optical modulation, but the detection sensitivity degrades if the amplitude is too small. In particular, when measuring the asymmetry of the modulator characteristic at startup, it is necessary to accurately measure the asymmetry by increasing the slope S of the error detection curve. Here, the input value Vd of the dither setting is changed to 128 and 64, and the error detection curve is measured.

The measurement condition of the error detection curve is that the sampling time is 24 milliseconds (12×2 msec), the voltage range is changed in a 0.1 V step size from −2.5 V to +2.5 V, and the dither component is detected at 51 points. The average points are 7 points. At Vd=128, there is no change from the actual ABC operation, but by setting Vd=64 (the dither amplitude is 3 times), the error detection curve becomes smooth and the change becomes large. This allows accurate measurement of the asymmetry of the modulator characteristics.

[Consideration of an Interaction between the Arms]

Figure 14A:
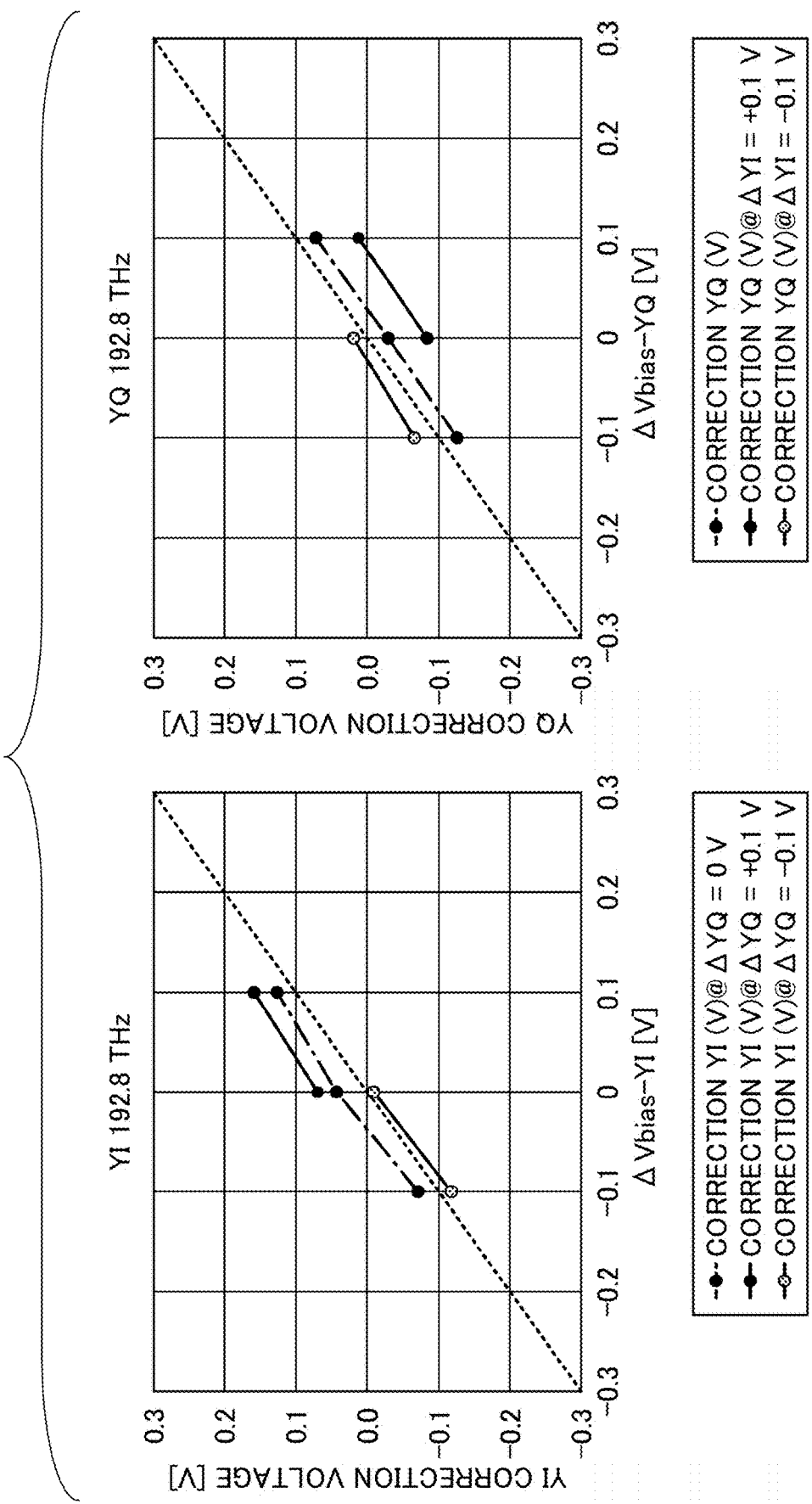
FIG. 14A is a graph indicating results of the investigation of corrected voltages in the I-arm and the Q-arm.
Figure 14B:
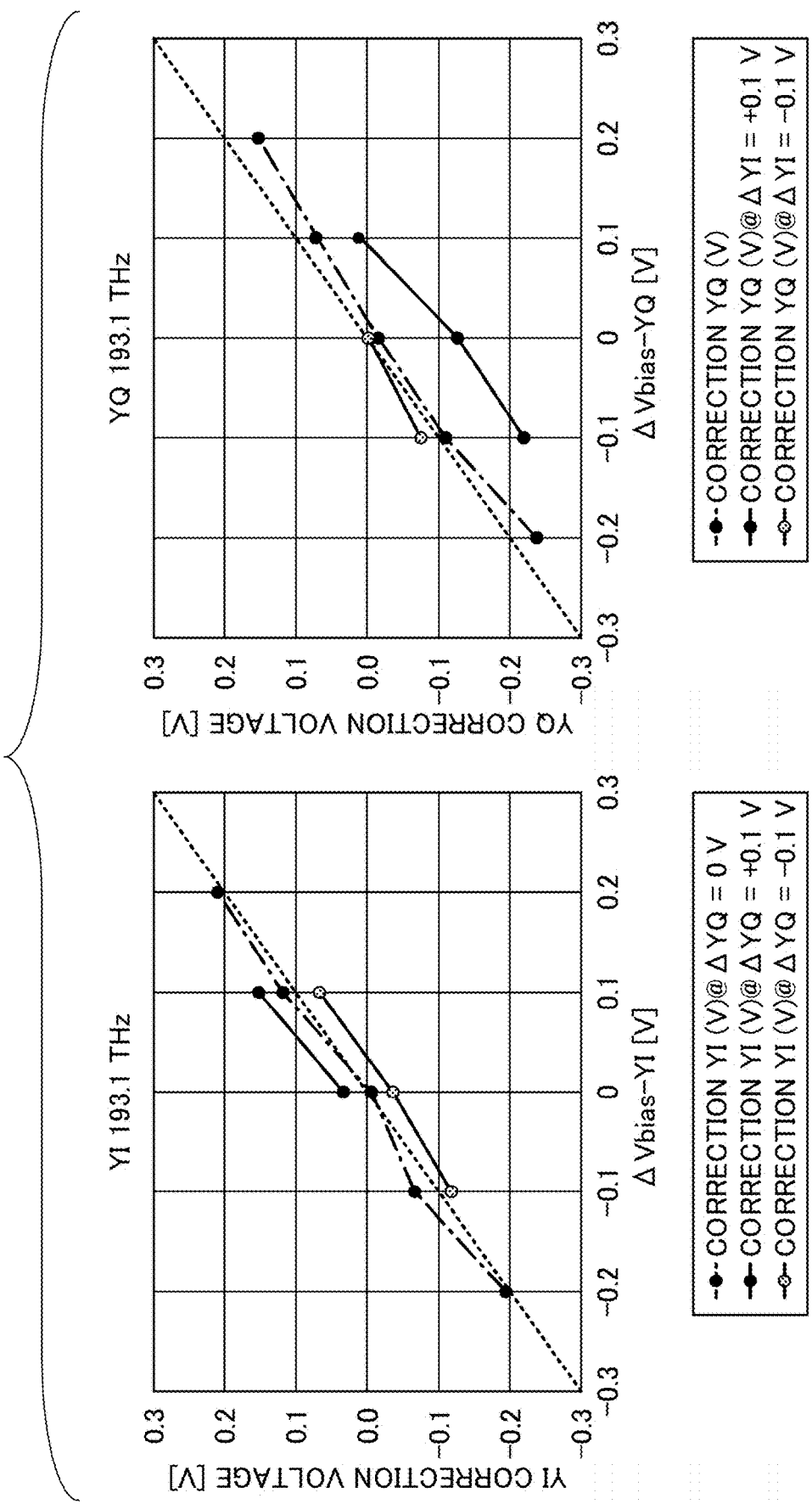
FIG. 14B is a graph indicating results of the investigation of corrected voltages in the I-arm and the Q-arm.
Figure 14C:
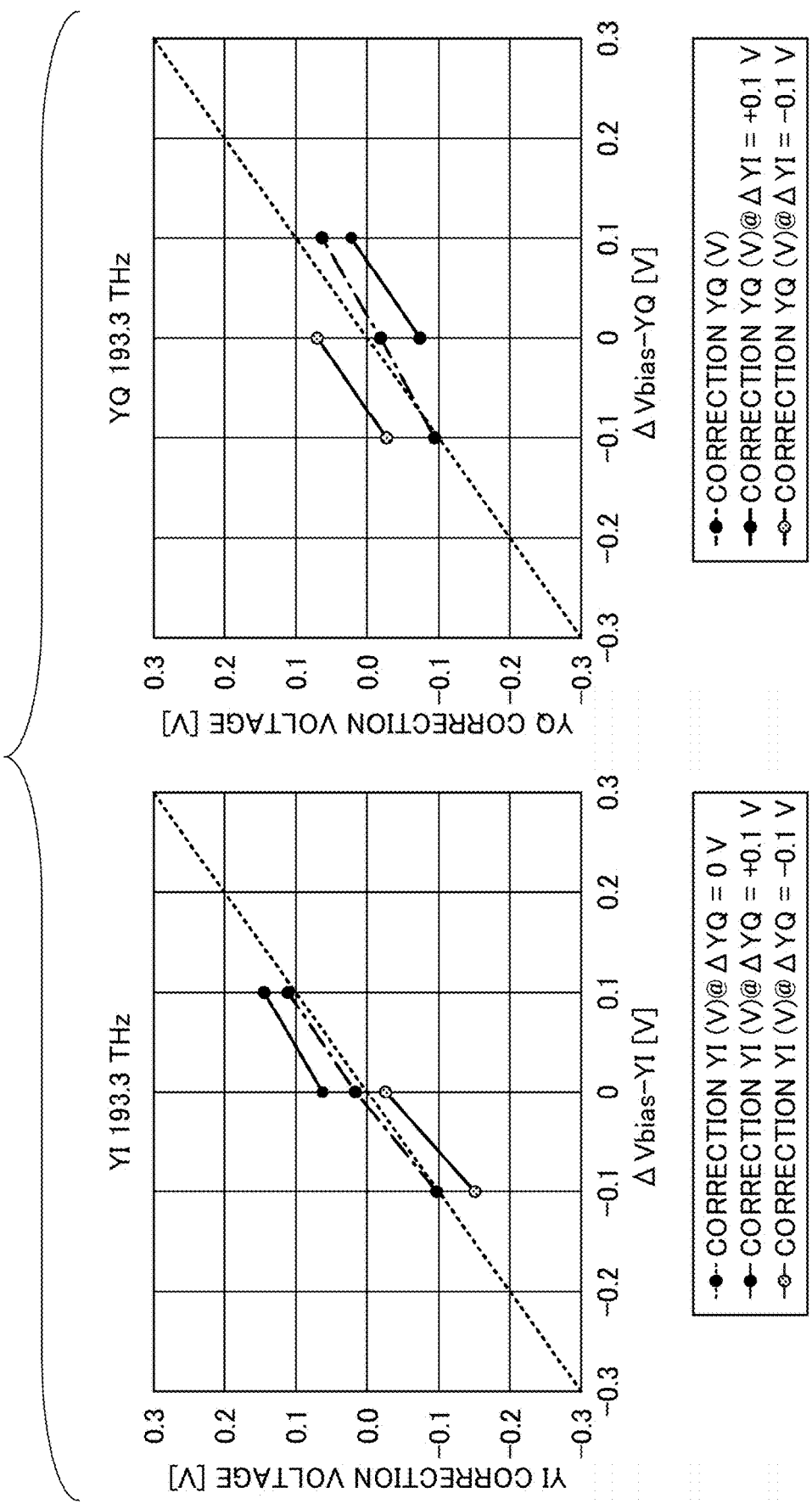
FIG. 14C is a graph indicating results of the investigation of corrected voltages in the I-arm and the Q-arm.

FIGS. 14A, 14B and 14C indicate results of an investigation of correction voltages for the I-arm and the Q-arm at 192.8 THz, 193.1 THz and 193.3 THz. A change in the correction voltage is measured in state in which the bias voltage is shifted by 0.1 V or 0.2 V from the optimum value. In FIGS. 14A to 14C, the left graph indicates results of measuring the correction voltage of the I-arm and the right graph indicates results of measuring the correction voltage of the Q-arm.

in each of FIGS. 14A to 14C, the dash-dot-dash line in the left graph indicates measured values of the I-arm correction voltage when the Q-arm bias is set to the optimum bias, the solid line with the black circles indicates measured values of the I-arm correction voltage when the Q-arm bias is shifted by +0.1 V from the optimum bias, and the solid line with the white circles indicates measured values of the I-arm correction voltage when the Q-arm bias is shifted by −0.1 V from the optimum bias. The dash-dot-dash line in the right graph indicates measured values of the Q-arm correction voltage when the I-arm bias is set to the optimum bias, the solid line with the black circles indicates measured values of the Q-aim correction voltage when the I-arm bias is shifted by +0.1 V from the optimum bias, and the solid line with the white circles indicates measured values of the Q-arm correction voltage when the I-arm bias is shifted by −0.1 V from the optimum bias.

When calculating the corrected bias voltage value in one arm (the I-arm or the Q-arm), when the bias voltage for the other arm (the Q-arm or the I-arm) is at the optimum point, the correction voltage becomes substantially correct. However, when the fixed bias voltage set in the other arm is shifted from the optimum bias, the correction bias voltage varies in the arm to be measured. That is, the bias state of the other arm influences the calculation of the corrected bias voltage value from the error detection curve in the child modulator to be measured.

The offset of the correction bias voltage is required to be within about 25 mV, but at some frequencies, more than four times greater than that can occur (see, in particular, FIG. 14B). The reason of 25 mV is that if the target of the residual offsets for the I-arm and the Q-arm is less than 5%, the allowable residual offset fluctuation is 2% when the residual offset fluctuation due to the dither modulation is 3%. Converting a 2% residual offset fluctuation to a voltage value yields 25 mV.

To reduce the correction bias voltage shift to 25 mV or less, it is necessary to optimize the fixed bias value set in the child modulator not to be measured for the error detection curve. Thus, in the second embodiment, the first embodiment is further improved to optimize the fixed bias set in the other arm when the error detection curve is measured.

Second Embodiment

Figure 15:
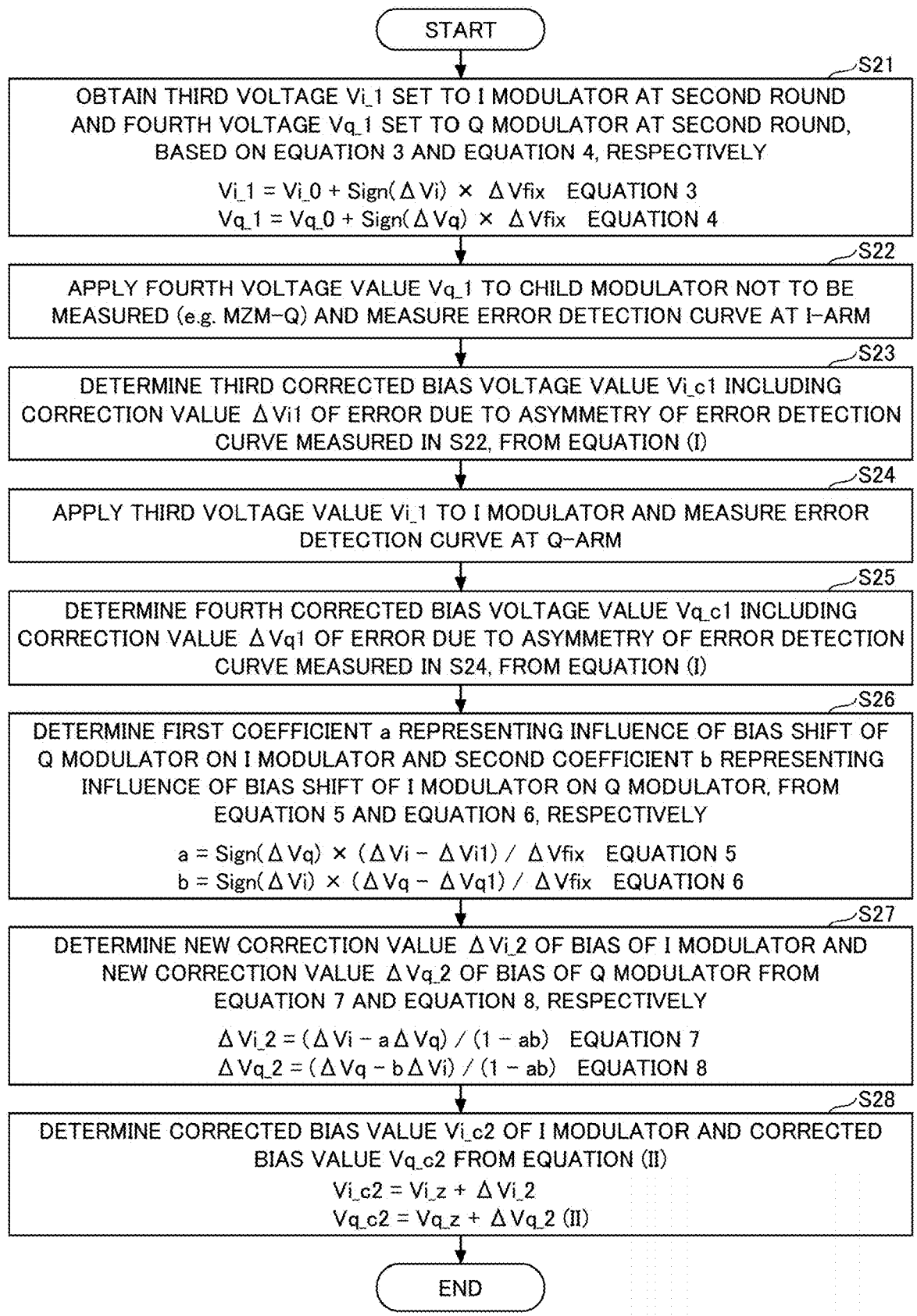
FIG. 15 is a flowchart of a bias control method according to a second embodiment.

FIG. 15 is a flow chart of bias control according to the second embodiment. In the second embodiment, the corrected bias voltage value is determined in consideration with the influence of the bias in the other child modulator on the child modulator to be measured.

The control flow of FIG. 15 is a process after the first corrected bias voltage value Vi_c of the I-arm child modulator 102 and the second corrected bias voltage value Vq_c of the Q-arm child modulator 103 are determined based on Equation (I) in the first embodiment. When the process of determining the first corrected bias voltage value Vi_c and the second corrected bias voltage value Vq_c according to Equation (I) is regarded as a process of a first round, the process of FIG. 15 is a process of a second round.

Using the first correction value ΔVi and the second correction value ΔVq obtained in the first round, a fixed third voltage value Vi_1 set in the I-arm child modulator 102 and a fourth voltage value V q1 fixed to the Q-arm child modulator 103 are obtained in the second round based on Equation 3 and Equation 4 (S21).

$$Vi\_1 = Vi\_0 + \text{Sign}(\Delta Vi) \times \Delta V\!f\!ix \quad \text{Equation 3}$$

$$Vq\_1 = Vq\_0 + \text{Sign}(\Delta Vq) \times \Delta V\!f\!ix \quad \text{Equation 4}$$

Here, Vi_0 is the first voltage value (for example, the design value) set in the I-arm at the time of the Q-arm measurement in the first round, and Vq_0 is the second voltage value (for example, the design value) set in the Q-arm at the time of the I-arm measurement in the first round. Sign( ) in Equation 3 and Equation 4 is a sign function and indicates a control direction in changing the voltage with a fixed step size ΔVfix.

Next, the error detection curve of the i-arm child modulator 102 is measured again (S22). At this time, a fourth voltage value Vq_1 determined in S21 is set in the Q-arm child modulator 103.

From the error detection curve measured in S21, a third corrected bias voltage value Vi_c1 of the I-arm child modulator 102 is obtained based on Equation (I) (S22). The third corrected bias voltage value Vi_c1 includes a third correction value ΔVi1 that corrects the error due to the asymmetry of the modulator characteristic.

$$Vi\_c1 = Vi\_z1 + \Delta Vi1$$

Here, Vi_z1 is the zero point voltage that reduces the error detection value to zero in the newly obtained error detection curve. The third correction value ΔVi1 is obtained based on the following equation by using a peak error voltage value Vi_p1, a bottom error voltage value Vi_b1, a peak error detection value Ei_p1, a bottom error detection value Ei_b1, and a slope Si1, of the newly obtained error detection curve.

$$\Delta Vi1 = c1 \times [(Vi\_p1 + Vi\_b1)/2 - Vi\_z1] + c2 \times [(Ei\_p1 + Ei\_b1)/2/Si1]$$

Here, the slope Si1 is a slope of the error detection curve at the zero crossing point between the peak error detection value and the bottom error detection value.

The error detection curve of the Q-arm child modulator 103 is also measured again (S24). At this time, the third voltage value Vi_1 determined in S21 is set in the I-arm child modulator 102.

From the error detection curve obtained in S24, a fourth corrected bias voltage value Vq_c1 of the Q-arm child modulator 103 is obtained by using Equation (I) (S25). The fourth corrected bias voltage value Vq_c1 includes a fourth correction value ΔVq1 that corrects the error due to the asymmetry of the modulator characteristic.

$$Vg\_c1 = Vq\_z1 + \Delta Vq1$$

Here, Vq_z1 is the zero point voltage that reduces the error detection value to zero in the error detection curve obtained by S24. The fourth correction value ΔVq1 is obtained based on the following equation by using a peak error voltage value Vq_p1, a bottom error voltage value Vq_b1, a peak error detection value Eq_p1, a bottom error detection value Eq_b1, and a slope Sq1, of the newly obtained error detection curve.

$$\Delta Vq1 = c1 \times [(Vq\_p1 + Vq\_b1)/2 - Vq\_z1] + c2 \times [(Eq\_p1 + Eq\_1)/2/Sq1]$$

Here, the slope Sq1 is a slope of the error detection curve at the zero crossing point between the peak error detection value and the bottom error detection value.

Next, a first coefficient a representing an influence of the bias shift of the Q-arm child modulator 103 on the I-arm child modulator 102 and a second coefficient b representing an influence of the bias shift of the I-arm child modulator 102 on the Q-arm child modulator 103 are obtained based on Equation 5 and Equation 6, respectively (S26).

$$a = \text{Sign}(\Delta Vq) \times (\Delta Vi - \Delta Vi1)/\Delta V\!f\!ix \quad \text{Equation 5}$$

$$b = \text{Sign}(\Delta Vi) \times (\Delta Vq - \Delta Vq1)/\Delta V\!f\!ix \quad \text{Equation 6}$$

A first modified correction value ΔVi_2 for modifying the first correction value ΔVi in the I-arm child modulator 102 and a second modified correction value ΔVq_2 for modifying the second correction value ΔVq in the Q-arm child modulator 103 are obtained using the first coefficient a, the second coefficient b, the first correction value ΔVi, and the second correction value ΔVq based on Equation 7 and Equation 8, respectively (S27).

$$\Delta Vi\_2 = (\Delta Vi - a\Delta Vq)/(1 - ab) \quad \text{Equation 7}$$

$$\Delta Vq\_2 = (\Delta Vq - b\Delta Vi)/(1 - ab) \quad \text{Equation 8}$$

The first modified corrected bias voltage value Vi_c2 set in the I-arm child modulator 102 and the second modified corrected bias voltage value Vq_c2 set in the Q-arm child modulator 103 are obtained based on Equation (II) (S28).

$$Vi\_c2 = Vi\_z + \Delta Vi\_2$$

$$Vq\_c2 = Vq\_z + \Delta Vq\_2 \quad \text{Equation (II)}$$

Vi_c2 and Vq_c2 are modified corrected bias voltage values set in the I-arm child modulator 102 and the Q-arm child modulator 103 in the second embodiment. The modified corrected bias voltage values are determined in consideration with the influence of the bias voltage on the other arm, so that the correction voltage shift is kept at the target value of 25 mV or less even when the bias voltage changes from the optimum value.

Effect Confirmation of the Second Embodiment

FIG. 16A and FIG. 16B indicate the effect of the bias control method of the second embodiment in comparison with that of the first embodiment. FIG. 16A indicates the characteristic of the I-arm in the Y polarization. FIG. 16B indicates the characteristic of the Q-arm in the Y polarization. In FIG. 16A, when determining the correction bias voltage of the I-arm in the first embodiment, if the initial bias voltage set in the Q-arm is appropriate (the initial bias shift is 0 V), even if the initial bias voltage in the I-arm is shifted, there is little bias shift in the corrected voltage. However, if the initial bias set in the Q-arm is shifted from the appropriate value, a bias shift of ±80 mV is generated in the corrected bias voltage of the I-arm. In the second embodiment, even if the initial bias of the Q-aim is shifted, the correction bias voltage of the I-arm is substantially constant.

In FIG. 16B, when determining the correction bias voltage of the Q-arm in the first embodiment, if the initial bias voltage set in the I-arm is appropriate (the initial bias shift is 0 V), even if the initial bias voltage is shifted in the I-arm, there is little bias shift in the corrected voltage. However, if the initial bias set in the Q-arm is shifted from the appropriate value, a significant bias shift occurs in the corrected bias voltage of the I-arm. In the second embodiment, if the initial bias of the I-arm is shifted, the correction bias voltage of the Q-arm is substantially constant.

In the second embodiment, the influence of the bias voltage, set in one arm among the arms of the IQ modulator, on the other arm is suppressed, and the bias voltage of the other arm is maintained to be substantially constant and independent bias control is performed in each arm, even when the bias voltage of the one arm fluctuates.

Figure 17A:
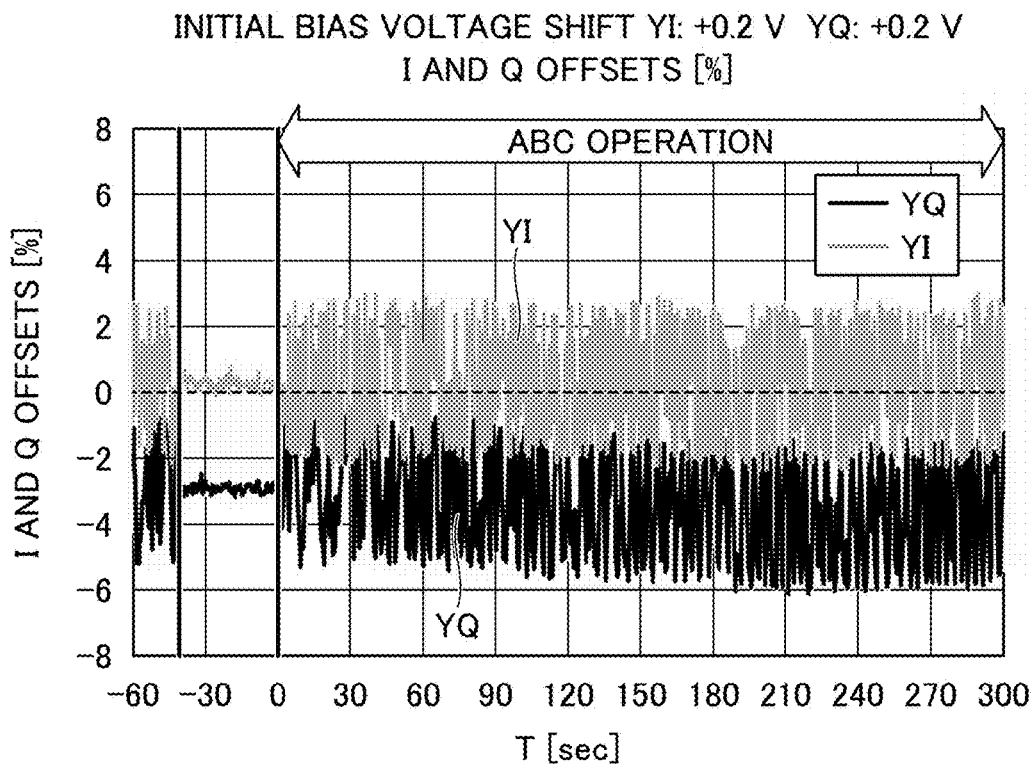
FIG. 17A and FIG. 17B are graphs indicating the effect of the bias control according to the second embodiment.
Figure 17B:
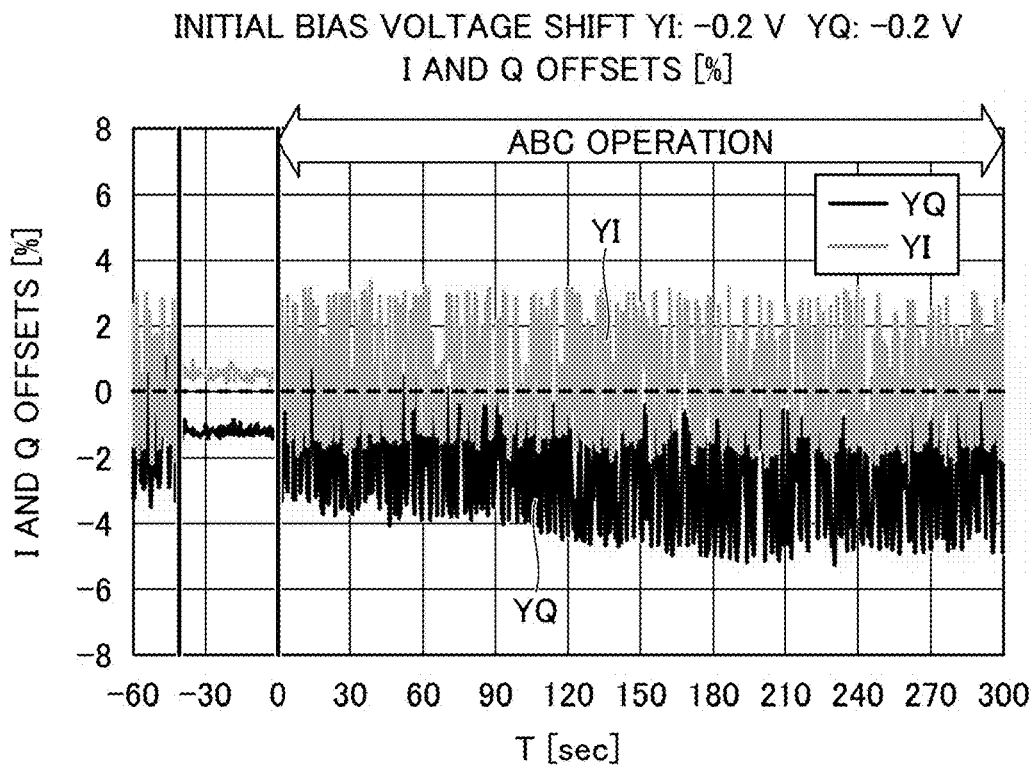

FIG. 17A and FIG. 17B are other graphs indicating the effect of the second embodiment. FIG. 17A indicates the residual offsets of the I-arm and the Q-arm when the initial bias voltage set in the actual ABC operation is shifted by +0.2V. FIG. 17B indicates the residual offsets of the I-arm and the Q-arm when the initial bias voltage set in the ABC operation is shifted by −0.2V.

Even if the initial bias voltage set at the start of the ABC operation has a bias voltage shift of about ±0.2 V, the total of the magnitudes (the absolute values) of the residual offsets of the I-arm and Q-arm remain within 5%.

FIG. 18A, FIG. 18B, and FIG. 18C are other graphs indicating the effect of the second embodiment, and indicating that the residual offset is reduced regardless of the frequency. FIG. 18A, FIG. 18B, and FIG. 18C indicate the residual offsets of the I-arm and the Q-arm at frequencies of 192.8 THz, 193.1 THz, and 193.3 THz, respectively. Regardless of the frequency, it can be seen that the residual offset is maintained in a substantially constant range during the ABC operation.

The dither amplitude may be returned to the dither amplitude used in the actual ABC operation and the dither component may be detected again, after determining the corrected bias voltage values V_c of the I-arm and the Q-arm in the method of the first or second embodiment. The error target value of FIG. 3 may be set as the error control value based on the error detection value of the dither component measured using a dither signal having a normal amplitude. Feedback control of a preliminary ABC operation may be performed using the set error target value, and when the changes of all the bias voltages of the I-arm child modulator, the Q-arm child modulator, and the parent modulator are within a set value, the startup operation may be terminated, assuming that the optical module enters a stable operation state.

Third Embodiment

FIG. 19 is a flowchart of bias control according to a third embodiment. In the third embodiment, the reduction of the accuracy of the bias control due to fluctuations of the power of the light input to the optical modulator 11 during the ABC operation is suppressed.

When a semiconductor laser is used as a light source of the optical transmission module 10, the output power of the semiconductor laser may fluctuate due to environment temperature changes and due to temporal changes caused by a long-term operation. As the power of the light input to the optical modulator 11 fluctuates, the non-zero error control value to be targeted changes in proportion to the fluctuation of the optical power. When the error control value is fixed, the residual offsets of the I-arm and the Q-arm during the ABC operation change due to the fluctuation of the optical power, and the accuracy of the bias control may be reduced.

To deal with this problem, in the third embodiment, the power of the light input to the optical modulator 11 or the light output from the optical modulator 11 is monitored, and the non-zero error control value is adjusted so as to conform to the fluctuation of the optical power.

In FIG. 19, when the operation of the optical transmission module 10 starts, an input of the local light to the optical modulator 11 (also referred to as the optical input) is turned on, and the operation of the optical modulator is started (turned on) (S31). At this stage, the conditions necessary for the bias setting of the optical modulator 11, such as the wavelength to be used (the peak wavelength of the local light), the modulation method (e.g., QPSK, QAM, and the like), the driving voltage of the optical modulator 11, and the like, have been determined.

Next, the error control value is set to start the ABC operation (S32). The error control value is set in the I-arm by the method described in S11 to 14 of FIG. 11 according to the first embodiment, and is set in the Q-arm by the method described in 15 to 16 according to FIG. 11, for example, but the methods are not limited to these methods. The error control value may be set by any method, as long as the non-zero error control value can be set in consideration with the asymmetry of the error detection curve. For example, a fixed value measured in advance may be used as the error control value before correction. In the pre-measurement, as in the first embodiment, a non-zero error target value, that is, an error control value, is set using the peak error detection value Ep, the bottom error detection value Eb, the peak error voltage value Vp, and the bottom error voltage value Vb, of the error detection curve representing the relationship between the error detection value and the voltage change. The error correction value may be obtained and the error control value may be determined using a value between the peak error detection value Ep and the bottom error detection value Eb, and a value between the peak error voltage value Vp and the bottom error voltage value Vb, instead of using the average of the peak error detection value Ep and the bottom error detection value Eb and the average of the peak error voltage value Vp and the bottom error voltage value Vb.

When the error control value is set, the ABC operation starts and feedback control is performed so that the error detection value is the error control value. The feedback control is performed on each of the I-arm and Q-arm as described in 17 of FIG. 11 of the first embodiment. That is, the I bias is controlled so that the first error detection value that is measured by detecting the first dither component from the output of the optical modulator 11 is the first error control value $E_I$ set in the I-arm. Additionally, the Q bias is controlled so that the second error detection value measured by detecting the second dither component from the output of the optical modulator 11 is the second error control value $E_Q$ set in the Q-arm.

When the bias voltage changes of all modulators including the two child modulators and the parent modulator are below a predetermined threshold value, stabilization of each bias by the ABC (ABC stabilization) is provided by notification and the startup of the ABC operation is completed (34). In the first embodiment and the second embodiment, the ABC control is performed during the actual operation of the optical transmission module 10 by using the set error control value. In the third embodiment, during the ABC operation, the power of the light input to the optical modulator 11 or the light output from the optical modulator 11 is monitored, and the error control value is adjusted so as to conform to the fluctuation of the optical power (35).

For example, the error control value is E, a monitor value of the current optical power is P, and a reference value of the optical power is P0. The error control value is E0 when the optical power is at the reference value P0, and the error control value E is corrected based on the following equation.

$$E=E0'(P/P0) \qquad \text{Equation 9}$$

The purpose of Equation 9 is to adjust the error control value E in proportion to the monitor value of the optical power. The reference value P0 of the optical power is, for example, the initial monitor value at the start of the ABC operation. Alternatively, the reference value P0 may be a previous optical power monitor value in the repetition cycles in which the error control value E is adjusted during the actual operation. Instead of using the ratio of the monitor value P of the optical power to the reference value P0, the correction may be performed in accordance with the fluctuation of the optical power by using the difference. When the IQ modulators in which the parent modulator is formed by the I-arm and the Q-arm is used, the first error control value $E_I$ of the I-arm and the second error control value $E_Q$ of the Q-arm are each adjusted so as to conform to the fluctuation of the optical power.

By performing 35, each bias of the optical modulator 11 can be appropriately controlled even when the power of the light input to the optical modulator 11 fluctuates over time during the actual operation of the optical transmission module 10. The monitoring of the fluctuation of the optical power in 35 is performed separately from the monitoring of the optical power for the dither component detection in the bias control, but the monitor value of the optical power for the dither component detection may be used for the monitoring of the fluctuation of the optical power.

The monitoring of the fluctuation of the optical power in 35 and the correction of the error control value (or the non-zero error target value) so as to conform to the fluctuation of the optical power may be incorporated in the bias control of the second embodiment in which the corrected bias voltage value is determined in consideration with the influence of the bias of the other child modulator.

FIG. 20 is a schematic dialog of a bias control circuit 12A of an optical transmission module 10A according to the third embodiment. Components the same as those of the ABC control circuit 12 according to the first embodiment are referenced by the same reference numerals, and overlapping descriptions may be omitted.

In FIG. 20, the monitor value of the photodetector 105 (see FIG. 6) disposed on the output side of the optical modulator 11 for dither component detection is also used for the monitoring of the fluctuation of the optical power. The photodetector 105 is, for example, a photodiode (PD).

During the actual operation, the switch 127 is opened and the switch 129 is closed. The monitor value of the optical power input to the bias control circuit 12A and sampled by the ADC 121 is input to the synchronous detection unit 1250 of the bias controller 125A and is input to a correction bias voltage calculator 1255A. The monitor value of the optical power input from the ADC 121 to the correction bias voltage calculator 1255A may be a time-averaged value of sampling values sampled at high speed for the dithering detection. The correction bias voltage calculator 1255A corrects the error control value (also referred to as the correction error value Err) set prior to the actual operation by using a change of the monitor value P of the optical power from the reference value P0. The control signal generator 1260 generates the DC bias control value of the ABC operation by using the corrected error control value. The DC bias control value is supplied to the DC bias generation circuits 123 and 124 through the closed switch 129.

As illustrated in FIG. 20, a configuration that utilizes the monitor value of the photodetector 105 at the output stage of the optical modulator 11 does not require an additional component and is a convenient configuration for monitoring the fluctuation of the optical power. The configuration is effectively used particularly when the loss change, the driving voltage fluctuation, or the bias change of the optical modulator 11 is small. Here, even if the influence of the loss change, the driving voltage fluctuation, or the bias change of the optical modulator 11 occurs to some extent, the DC bias of the optical modulator 11 can be converged to the optimum point to a certain extent by correcting the error control value according to the fluctuation of the optical power.

FIG. 21 illustrates another configuration example for the monitoring of the fluctuation of the optical power. In FIG. 21, the optical power is monitored in a prior stage of the optical modulator 11. A tap (also referred to as a splitter) 107 is provided at the input stage of the optical modulator 11 to branch a portion of the input light and detect the optical power at the photodetector 106. For example, 90% of the optical power of the local light is input to the optical modulator 11, and 10% of the optical power of the local light is branched to the photodetector 106 (in this case, the branch ratio is 90:10). The optical power branched into the photodetector 106 may be less than 10%. The monitoring result of the photodetector 106 is input to the ADC 121 of the bias control circuit 12B and digitized. In addition to the ADC 121, an ADC for the photodetector 106 may be provided. In this case, the output of the newly provided ADC is input to the correction bias voltage calculator (see FIG. 10) of the bias controller 125B, and the error control value (or the correction error value Err) is corrected.

In the configuration of FIG. 21, the tap 107 and the photodetector 106 are added, and thus the number of components increases in comparison with the configuration of FIG. 20. Further, with respect to the local light input to the optical modulator, the optical power is reduced not only by the branching but also by the insertion loss of the tap 107, but the monitoring accuracy is good. The monitoring accuracy is good, so that the error control value can be more accurately adjusted in accordance with the fluctuation of the optical power input to the optical modulator 11.

FIG. 22 illustrates yet another example of the monitor for the fluctuation of the optical power. In FIG. 22, the output of the photodetector 108 embedded in a light source 130 is used to monitor the fluctuation of the optical power. The light source 130 is a light source unit including, for example, a laser diode. The output of the photodetector 108 is digitized with an ADC included in the light source unit and is input to a bias controller 125C of a bias control circuit 12C. The sampling rate of the ADC included in the light source unit may be less than the sampling rate of the photodetector 105 for the dither detection.

The configuration of FIG. 22 is simple and does not require any additional components with respect to the configuration of FIG. 20. The configuration is used effectively when the optical coupling loss change from the output of the light source 130 to the optical modulator 11 is small. When the loss change from the output of the light source 130 to the optical modulator 11 is significant, there may be the influence of the loss change. But the loss change from the output of the light source 130 to the optical modulator 11 is not so large because the optical modulator 11 is directly connected to the light source 130 through an optical fiber or spatial optical coupling system, generally.

Depending on the characteristics of respective optical components used in the optical transmission modules 10A to 10C, any of the configurations of FIGS. 20 to 22 may be used. By using one of the configurations, the error control value can be adjusted so as to conform to the fluctuation of the power of the light input to the optical modulator 11, and the DC bias value can be appropriately set in accordance with the residual offsets of the Q-arm and the I-arm.

Although the first to third embodiments have been described with reference to the specific configuration examples above, the present disclosure is not limited to the above-described configuration examples. The frequencies of the dither signal used in the I-arm, Q-arm, and parent modulator 101 are not limited to the frequencies described in the embodiments, and an appropriate frequency at which the error detection can be measured without interfering with the operation of the optical modulator can be selected. Prior to the measurement of the error detection curve in the first round, the optical power may be measured with changing the bias voltages of the I-arm, Q-arm, and parent modulator to determine a coarse bias voltage setting value as an initial value. This initial value may be used as a fixed voltage to be set in the other arm, when measuring the error detection curve in one arm. While the coarse bias is set, the optical power may be measured at dozens to hundreds of points to reduce the bias shift from the optimum to ±0.2 V or less.

Through the first embodiment to the third embodiment, when the optical modulator 11 has wavelength dependency, the error control value (i.e., the error target value) may be set in accordance with the peak wavelength of the local light.

It should be understood that the embodiments disclosed herein are exemplary in all respects and are not restrictive. It is intended that the scope of the invention is set forth by the appended claims, and includes all modifications within the meaning and scope of the claims that are equivalent to the scope of the claims.

What is claimed is:

1. A bias control method of a nested optical modulator in which a first child modulator and a second child modulator form two arms of a parent modulator, the bias control method comprising:
    a) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;
    b) obtaining a first error detection curve representing a relationship between the first error detection value and the voltage value of the first bias;
    c) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;
    d) obtaining a first correction value $\Delta Vi$ based on Equation 1, where $Vp$ is the first peak error voltage value, $Vb$ is the first bottom error voltage value, $Ep$ is the first peak error detection value, $Eb$ is the first bottom error detection value, $c1$ is a first weight value, $c2$ is a second weight value, and $S$ is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1); and}$$

e) obtaining the first error detection value that is obtained when the voltage value of the first bias is equal to a voltage value obtained by adding the first correction value $\Delta Vi$ to the voltage value the first bias at the first zero crossing point, as a first error control value,
       wherein the first bias is controlled so that the first error detection value is the first error control value, the first error detection value being measured by detecting the first frequency component included in the output of the optical modulator, and the frequency of the first frequency component being equal to the frequency of the first dither.

2. The bias control method claimed in claim 1 further comprising:
    applying a second bias having a second voltage value to the second child modulator before a);
    performing, after e), steps including:
        f) applying the first bias having a first voltage value to the first child modulator;
        g) detecting a second frequency component included in the output of the optical modulator, in a state in which the local light is input to the optical modulator and a modulation signal is applied to the second child modulator together with the second bias on which a second dither signal is superimposed, with changing a voltage value of the second bias, to measure a second error detection value; the second frequency component having a frequency equal to a frequency of the second dither signal,
        h) obtaining a second error detection curve representing a relationship between the second error detection value and the voltage value of the second bias;
        i) obtaining a second peak error detection value, a second bottom error detection value, a second peak error voltage value, and a second bottom error voltage value, from the second error detection curve, the second peak error detection value being a peak value of the second error detection value, the second bottom error detection value being a bottom value of the second error detection value, the second peak error voltage value being the voltage value of the second bias that is observed when the second error detection value is the second peak error detection value, and the second bottom error voltage value being the voltage value of the second bias that is observed when the second error detection value is the second bottom error detection value;
        j) obtaining a second correction value $\Delta Vq$ based on Equation 2, where $Vpq$ is the second peak error voltage value, $Vbq$ is the second bottom error voltage value, $Epq$ is the second peak error detection value, $Ebq$ is the second bottom error detection value, and $Sq$ is a slope of the second error detection curve at a second zero crossing point between the second peak error voltage value and the second bottom error voltage value, $$\Delta Vq = c1 \times [(Vpq+Vbq)/2] + c2 \times [(Epq+Ebq)/2/Sq] \quad \text{(Equation 2); and}$$

k) obtaining the second error detection value that is obtained when the voltage value of the second bias is equal to a voltage value obtained by adding the second correction value $\Delta Vq$ to the voltage value the second bias at the second zero crossing point, as a second error control value, wherein the second bias is controlled so that the second error detection value is the second error control value, the second error detection value being obtained by detecting the second frequency component included in the output of the optical modulator, and the frequency of the second frequency component being equal to the frequency of the second dither.

3. The bias control method claimed in claim 1 further comprising:

performing, after or in parallel to the control of the first bias, a step of l) monitoring optical power, input to the optical modulator or output from the optical modulator, to correct the first error control value based on $E=E0\times(P/P0)$, where P is a value of the optical power based on a result of the monitoring, E is the first error control value, P0 is a reference value of the optical power, and E0 is the first error control value obtained when the value of the optical power is the reference value.

4. A bias control method of a nested optical modulator in which a first child modulator and a second child modulator form two arms of a parent modulator, the bias control method comprising:

A) applying a second bias having a second voltage value to the second child modulator;

B) detecting a first frequency component included in an output of the optical modulator, in a state in which local light is input to the optical modulator and a modulation signal is applied to the first child modulator together with a first bias on which a first dither signal is superimposed, with changing a voltage value of the first bias, to measure a first error detection value, the first frequency component having a frequency equal to a frequency of the first dither signal;

C) obtaining a first error detection curve representing a relationship between the first error detection value and the voltage value of the first bias;

D) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;

E) obtaining a first correction value $\Delta Vi$ based on Equation 1, where Vp is the first peak error voltage value, Vb is the first bottom error voltage value, Ep is the first peak error detection value, Eb is the first bottom error detection value, c1 is a first weight value, c2 is a second weight value, and S is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1);}$$

F) applying the first bias having the first voltage value to the first child modulator;

G) detecting a second frequency component included in the output of the optical modulator, in a state in which the local light is input to the optical modulator and a modulation signal is applied to the second child modulator together with the second bias on which a second dither signal is superimposed, with changing a voltage value of the second bias, to measure a second error detection value; the second frequency component having a frequency equal to a frequency of the second dither signal, H) obtaining a second error detection curve representing a relationship between the second error detection value and the voltage value of the second bias;

I) obtaining a second peak error detection value, a second bottom error detection value, a second peak error voltage value, and a second bottom error voltage value, from the second error detection curve, the second peak error detection value being a peak value of the second error detection value, the second bottom error detection value being a bottom value of the second error detection value, the second peak error voltage value being the voltage value of the second bias that is observed when the second error detection value is the second peak error detection value, and the second bottom error voltage value being the voltage value of the second bias that is observed when the second error detection value is the second bottom error detection value;

J) obtaining a second correction value $\Delta Vq$ based on Equation 2, where Vpq is the second peak error voltage value, Vbq is the second bottom error voltage value, Epq is the second peak error detection value, Ebq is the second bottom error detection value, and Sq is a slope of the second error detection curve at a second zero crossing point between the second peak error voltage value and the second bottom error voltage value, $$\Delta Vq = c1 \times [(Vpq+Vbq)/2] + c2 \times [(Epq+Ebq)/2/Sq] \quad \text{(Equation 2);}$$

K) obtaining a third voltage value $Vi\_1$ based on Equation 3 and obtaining a fourth voltage value $Vq\_1$ based on Equation 4, where $Vi\_0$ is the first voltage value, $Vq\_0$ is the second voltage value, sign( ) is a sign function, and $\Delta Vfix$ is a step size of a voltage change, $$Vi\_1 = Vi\_0 + \text{Sign}(\Delta Vi) \times \Delta Vfix \quad \text{(Equation 3)}$$

$$Vq\_1 = Vq\_0 + \text{Sign}(\Delta Vq) \times \Delta Vfix \quad \text{(Equation 4);}$$

L) applying the second bias having the fourth voltage value to the second child modulator;

M) performing B), C), D), and E), in a state in which the second bias having the fourth voltage value is applied to the second child modulator, to obtain the first correction value as a third correction value;

N) applying the first bias having the third voltage value to the first child modulator;

O) performing G), H), I), and J), in a state in which the first bias having the third voltage value is applied to the first child modulator, to obtain the second correction value as a fourth correction value;

P) obtaining a first coefficient a and a second coefficient b based on Equation 5 and Equation 6, respectively, the first coefficient a representing an influence of a bias of the first child modulator on the second child modulator, and the second coefficient b representing an influence of a bias of the second child modulator on the first child modulator, $$a = \text{Sign}(\Delta Vq) \times (\Delta Vi - \Delta Vi\_1)/\Delta Vfix \quad \text{(Equation 5)}$$

$$b = \text{Sign}(\Delta Vi) \times (\Delta Vq - \Delta Vq\_1)/\Delta Vfix \quad \text{(Equation 6)};$$

Q) using the first coefficient a and the second coefficient b to obtain a first modified correction value $\Delta Vi\_2$ and a second modified correction value $\Delta Vq\_2$ based on Equation 7 and Equation 8, respectively, the first modified correction value $\Delta Vi\_2$ modifying the first correction value, and the second modified correction value $\Delta Vq\_2$ modifying the second correction value, $$\Delta Vi\_2 = (\Delta Vi - a\Delta Vq)/(1-ab) \quad \text{(Equation 7)}$$

$$\Delta Vq\_2 = (\Delta Vq - b\Delta Vi)/(1-ab) \quad \text{(Equation 8); and}$$

R) obtaining the first error detection value obtained when the voltage value of the first bias is equal to a voltage value obtained by adding the first modified correction value $\Delta Vi\_2$ to the voltage value of the first bias at the first zero crossing point, as a third error control value, and obtaining the second error detection value obtained when the voltage value of the second bias is equal to a voltage value obtained by adding the second modified correction value $\Delta Vq\_2$ to the voltage value of the second bias at the second zero crossing point, as a fourth error control value, wherein the first bias is controlled so that the first error detection value measured by detecting the first frequency component included in the output of the optical modulator is the third error control value, and the second bias is controlled so that the second error detection value measured by detecting the second frequency component included in the output of the optical modulator is the fourth error control value, the frequency of the first frequency component being equal to the frequency of the first dither signal, and the frequency of the second frequency component being equal to the frequency of the second dither signal.

5. An optical transmission module comprising:

a nested optical modulator in which a first child modulator and a second child modulator form two arms of a parent modulator; and a bias control circuit configured to control a bias voltage of the optical modulator, wherein the bias control circuit includes:
  a first bias generation circuit configured to apply, to the first child modulator, a first bias on which a first dither signal is superimposed;
  a synchronous detector configured to detect a first frequency component included in an output of the optical modulator, in a state in which local light is input to the optical modulator and a modulation signal is applied to the first child modulator together with the first bias on which the first dither signal is superimposed, to measure an error detection value, the first frequency component having a frequency equal to a frequency of the first dither signal;
  a correction bias voltage calculator configured to perform a process including:
    A1) obtaining, based on a first error detection value that is the error detection value detected by the synchronous detection unit when a voltage value of the first bias is changed, a first error detection curve representing a relationship between the first error detection value and the voltage value of the first bias;
    B1) obtaining a first peak error detection value, a first bottom error detection value, a first peak error voltage value, and a first bottom error voltage value, from the first error detection curve, the first peak error detection value being a peak value of the first error detection value, the first bottom error detection value being a bottom value of the first error detection value, the first peak error voltage value being the voltage value of the first bias that is observed when the first error detection value is the first peak error detection value, and the first bottom error voltage value being the voltage value of the first bias that is observed when the first error detection value is the first bottom error detection value;
    C1) obtaining a first correction value $\Delta Vi$ based on Equation 1, where Vp is the first peak error voltage value, Vb is the first bottom error voltage value, Ep is the first peak error detection value, Eb is the first bottom error detection value, c1 is a first weight value, c2 is a second weight value, and S is a slope of the first error detection curve at a first zero crossing point between the first peak error voltage value and the first bottom error voltage value, $$\Delta Vi = c1 \times [(Vp+Vb)/2] + c2 \times [(Ep+Eb)/2/S] \quad \text{(Equation 1); and}$$

D1) obtaining the first error detection value that is obtained when the voltage value of the first bias is equal to a voltage value obtained by adding the first correction value $\Delta Vi$ to the voltage value the first bias at the first zero crossing point, as a first error control value, and
  a control signal generator configured to control the first bias so that the first error detection value is the first error control value, the first error detection value being measured by detecting the first frequency component included in the output of the optical modulator, the frequency of the first frequency component being equal to the frequency of the first dither.

6. The optical transmission module claimed in claim 5 further comprising:

a photodetector configured to monitor optical power of light input to the optical modulator or output from the optical modulator, wherein the bias control circuit corrects the first error control value based on $E = E0 \times (P/P0)$, where P is a value of the optical power based on a result of the monitoring of the photodetector, E is the first error control value, P0 is a reference value of the optical power, and E0 is the first error control value obtained when the value of the optical power is the reference value.

* * * * *